（12） United States Patent
Morimoto et al.

(10) Patent No.: US 9,185,710 B2
(45) Date of Patent: Nov. 10, 2015

(54) RADIO COMMUNICATION SYSTEM AND RADIO BASE STATION

(71) Applicant: NTT DOCOMO, INC., Chiyoda-ku (JP)

(72) Inventors: Akihito Morimoto, Chiyoda-ku (JP); Masashige Shirakabe, Chiyoda-ku (JP); Nobuhiko Miki, Chiyoda-ku (JP); Yukihiko Okumura, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 0 days.

(21) Appl. No.: 14/394,166

(22) PCT Filed: Mar. 26, 2013

(86) PCT No.: PCT/JP2013/058799
§ 371 (c)(1),
(2) Date: Oct. 13, 2014

(87) PCT Pub. No.: WO2013/168475
PCT Pub. Date: Nov. 14, 2013

(65) Prior Publication Data
US 2015/0119053 A1 Apr. 30, 2015

(30) Foreign Application Priority Data
May 9, 2012 (JP) ................................ 2012-107671

(51) Int. Cl.
*H04W 72/04* (2009.01)
*H04W 16/08* (2009.01)
(Continued)

(52) U.S. Cl.
CPC ......... *H04W 72/0493* (2013.01); *H04L 5/0032* (2013.01); *H04W 16/08* (2013.01); *H04W 16/32* (2013.01); *H04W 48/16* (2013.01); *H04W 52/34* (2013.01)

(58) Field of Classification Search
CPC . H04W 28/26; H04W 72/02; H04W 72/0493; H04W 72/04; H04W 76/066
See application file for complete search history.

(56) References Cited

U.S. PATENT DOCUMENTS

2011/0122769 A1* 5/2011 Zhang ........................... 370/235
2013/0028228 A1 1/2013 Nakayama et al.

FOREIGN PATENT DOCUMENTS

JP 2012-129646 7/2012
WO WO 2011/129447 A1 10/2011

OTHER PUBLICATIONS

International Search Report issued May 14, 2013, in PCT/JP13/58799 filed Mar. 26, 2013.
(Continued)

*Primary Examiner* — Curtis Odom
(74) *Attorney, Agent, or Firm* — Oblon, McClelland, Maier & Neustadt, L.L.P.

(57) ABSTRACT

A high-power radio base station includes a resource setter configured to determine a ratio of the number of second resources at which the radio communicator should stop radio transmission to the sum of the number of the second resources and the number of first resources at which the radio communicator should execute radio transmission. The resource setter determines the ratio on the basis of a first number and a second number, the first number being the number of mobile terminals that are assumed to be connected with the radio base station, rather than the low-power radio base station, when cell range expansion (CRE) is not applied, but are connected with the low-power radio base station by virtue of application of cell range expansion, the second number being the number of mobile terminals connected with the radio base station when cell range expansion is applied. The resource setter determines the ratio in such a manner that the greater the proportion of the second number to the first number, the smaller the ratio.

6 Claims, 10 Drawing Sheets

(51) Int. Cl.
  *H04W 16/32* (2009.01)
  *H04W 48/16* (2009.01)
  *H04L 5/00* (2006.01)
  *H04W 52/34* (2009.01)

(56) References Cited

OTHER PUBLICATIONS

Japanese Office Action issued Aug. 26, 2014, in Japanese Patent Application No. 2012-107671 filed May 9, 2012 (with English Translation).

"3 rd Generation Partnership Project; Technical Specification Group Radio Access Network; Evolved Universal Terrestrial Radio Access (E-UTRA); Further advancements for E-UTRA physical layer aspects (Release 9)", 3GPP TR 36.814 v9.0.0 (Mar. 2010), 104 pages.

"Performance of eICIC with Control Channel Coverage Limitation", R1-103264, 3GPP TSG RAN WG1 Meeting #61, May 10-14, 2010, 8 pages.

* cited by examiner

RADIO COMMUNICATION SYSTEM AND RADIO BASE STATION

FIELD OF THE INVENTION

The present invention relates to a radio communication system and to a radio base station.

BACKGROUND ART

Recently, a heterogeneous network (sometimes abbreviated "HetNet") is proposed in which multiple types of radio base stations (macro base stations, pico base stations, femto base stations, remote radio heads, etc.) having different transmission powers (transmission capabilities), are deployed in a multi-layered way (for example, Non-patent Document 1).

In a heterogeneous network, base stations having a higher transmission power (transmission capability), e.g., macro base stations, are likely to be selected as the radio access points for user terminals at the stage of cell search or handover, in comparison with other base stations having a lower transmission power (transmission capability), e.g., pico base stations. Accordingly, it is assumed that connections of user terminals (mobile terminals) are concentrated at base stations with higher transmission power, and thus, there will be a tendency for excessive communication load at base stations with higher transmission power.

Accordingly, a technique called cell range expansion has been proposed. The cell range expansion is a technique to give an offset value (bias value) to the reception quality or reception power from the low-power radio base station, the reception quality or the reception power being an index for cell selection by the mobile terminal. The reception quality or the reception power from the low-power radio base station to which an offset value has been added (or added in the unit of dB) is compared with the reception quality or the reception power from the macro base station. As a result, the reception quality or the reception power from the low-power radio base station is likely to become better than the reception quality or the reception power from the macro base station. Consequently, since mobile terminals select to connect to the low-power radio base station than the macro base station, the cell range of the low-power radio base station is expanded, and it is likely that the communication load of the macro base station is reduced.

However, when the cell range of the low-power radio base station is expanded by the cell range expansion (CRE), the mobile terminal located at the edge of the cell of the low-power radio base station may be subject to high levels of interference by radio waves from the neighboring macro base station. Therefore, a technique called enhanced inter-cell interference coordination or enhanced inter-cell interference control, which is an extension of the inter-cell interference coordination or inter-cell interference control, has been proposed. This technique is abbreviated as eICIC. The eICIC is described, for example, in Non-patent Document 2.

The eICIC is classified into a frequency domain-based eICIC and a time domain-based eICIC. In either type, eICIC is a technique to limit resources available for a macro base station in order to prevent or minimize interference at mobile terminals connected with the low-power radio base station.

In the frequency domain-based eICIC, multiple frequency bands are prepared. First frequency bands are used for downlink transmission from the macro base station to mobile terminals connected with the macro base station and for downlink transmission from the low-power radio base stations to mobile terminals at the centers of the cells of the low-power radio base stations (e.g., mobile terminals connected with the low-power radio base stations without CRE). Second frequency bands are used for downlink transmission from the low-power radio base station to mobile terminals at the edges of the cells of the low-power radio base stations (e.g., mobile terminals connected with the low-power radio base stations by virtue of CRE), and are not used for downlink transmission from the macro base station. Thus, it is expected to prevent mobile terminals at the edges of the cells of the low-power radio base stations from being interfered by radio waves from the macro base station.

In the time domain-based eICIC, the macro base station and the low-power radio base station use the same frequency band, but different time units (for example, subframes) are used for different purposes. The low-power radio base station is capable of doing continuous downlink transmission. However, the macro base station can perform downlink transmission only intermittently. As a result, a period during which only the low-power radio base stations perform downlink transmission (protected subframe) and a period during which the macro base station and the low-power radio base stations perform downlink transmission (non-protected subframe) are repeated. The non-protected subframes are used for downlink transmission from the macro base station to mobile terminals connected with the macro base station and for downlink transmission from the low-power radio base stations to mobile terminals at the centers of the cells of the low-power radio base stations (e.g., mobile terminals connected with the low-power radio base stations without CRE). The protected subframes are used for downlink transmission from the low-power radio base station to mobile terminals at the edges of the cells of the low-power radio base stations (e.g., mobile terminals connected with the low-power radio base stations by virtue of CRE). Thus, it is expected to prevent mobile terminals at the edges of the cells of the low-power radio base stations from being interfered by radio waves from the macro base station.

RELATED ART DOCUMENTS

Non-Patent Documents

Non-patent Document 1: 3rd Generation Partnership Project; Technical Specification Group Radio Access Network; Evolved Universal Terrestrial Radio Access (E-UTRA); Further advancements for E-UTRA physical layer aspects (Release 9); 3GPP TR 36.814 V9.0.0 (2010-03); Section 9A, Heterogeneous Deployments Non-patent Document 2: R1-103264, 3GPP TSG RAN WG1 Meeting #61, Montreal, Canada, May 10-14, 2010, Source: NTT DOCOMO, Title: "Performance of eICIC with Control Channel Coverage Limitation", Agenda Item: 6.8, Document for: Discussion and Decision

SUMMARY OF THE INVENTION

In eICIC, resources usable by the macro base station are limited. In the frequency domain-based eICIC, the macro base station cannot utilize some frequency bands for downlink transmission, whereas in the time domain-based eICIC, the macro base station cannot perform downlink transmission in protected subframes. In a case in which many mobile terminals utilize the macro base station and few mobile terminals utilize low-power radio base stations, it is undesirable to set the amount of resources unusable by the macro base station to a high level.

On the other hand, in the frequency domain-based eICIC, when the low-power radio base stations use some frequency band for downlink transmission, mobile terminals are likely to be subject to interference from the macro base station. In the time domain-based eICIC, when the low-power radio base stations perform downlink transmission at the non-protected subframes, mobile terminals are likely to be subject to interference from the macro base station. In a case in which many mobile terminals utilize low-power radio base stations and few mobile terminals utilize the macro base station, it is undesirable to set the amount of resources usable by the macro base station to a high level.

Furthermore, it is assumed, in the real world, that the number of mobile terminals that utilize the macro base station or the traffic of the mobile terminals, and the number of mobile terminals that utilize the low-power radio base station or the traffic of the mobile terminals, will change over time.

Accordingly, the present invention provides a technology, in a radio communication system, in which a high-power radio base station and a low-power radio base station collaborate for inter-cell interference control, for controlling suitably the amount of resources usable at the high-power radio base station depending on the actual usage status of radio base stations.

A radio communication system according to one aspect of the present invention includes: at least one high-power radio base station that forms a first cell and communicates with multiple mobile terminals; and at least one low-power radio base station connected with the high-power radio base station and communicates with multiple mobile terminals, the low-power radio base station having a transmission power less than a transmission power of the high-power radio base station and forming a second cell within the first cell, the second cell being smaller than the first cell, the high-power radio base station being configured to execute wireless transmission to the mobile terminals using resources that are the same as resources used by the low-power radio base station, and being configured to collaborate with the low-power radio base station for inter-cell interference control. The high-power radio base station includes: a radio communicator configured to execute wireless communication with mobile terminals connected with the high-power radio base station; a resource setter configured to determine a ratio of the number of second resources at which the radio communicator of the high-power radio base station should stop radio transmission to the sum of the number of the second resources and the number of first resources at which the radio communicator of the high-power radio base station should execute radio transmission; and a communication controller configured to execute radio transmission at the first resources and to stop radio transmission at the second resources in accordance with the ratio determined by the resource setter or a modified ratio resulting from modification of the ratio. The resource setter is configured to determine the ratio on the basis of a first proportion and a second proportion, the first proportion being a proportion of the number of mobile terminals that are assumed to be connected with the high-power radio base station, rather than the low-power radio base station, when cell range expansion is not applied, but are connected with the low-power radio base station by virtue of application of cell range expansion to the total number of mobile terminals located in the first cell and connected with the high-power radio base station or the low-power radio base station, the second proportion being a proportion of the number of mobile terminals connected with the high-power radio base station when cell range expansion is applied to the total number of mobile terminals located in the first cell and connected with the high-power radio base station or the low-power radio base station, the resource setter being configured to determine the ratio in such a manner that the greater the proportion of the second proportion to the first proportion, the smaller the ratio.

The first proportion is the proportion of the number of mobile terminals actually located at the edge of the cell of the low-power radio base station (mobile terminals that are assumed to be connected with the high-power radio base station, rather than the low-power radio base station if cell range expansion is not applied, but have been connected with the low-power radio base station by virtue of expansion of the second cell by application of cell range expansion) to the total number of mobile terminals located in the first cell and actually connected with the high-power radio base station or the low-power radio base station. The first proportion can be considered to correspond to the second resources at which the high-power radio base station should stop radio transmission. The second proportion is the proportion of the number of mobile terminals that have actually been connected with the high-power radio base station when cell range expansion is applied to the total number of mobile terminals located in the first cell and actually connected with the high-power radio base station or the low-power radio base station. The second proportion can be considered to correspond to the first resources at which the high-power radio base station should execute radio transmission. According to this aspect, it is possible to set the ratio of the number of the second resources to the sum of the number of the first resources and the number of the second resources in such a manner that the greater the proportion of the second proportion to the first proportion, the smaller the ratio. In summary, in a case in which there are few mobile terminals located at the edge of the cell of the low-power radio base station and utilize the second resources and there are many mobile terminals utilizing the high-power radio base station, it is possible to set the amount of the second resources unusable by the high-power radio base station to a low level and to set the amount of the first resources usable by the high-power radio base station to a high level. On the other hand, in a case in which there are many mobile terminals located at the edge of the cell of the low-power radio base station and utilize the second resources and there are few mobile terminals utilizing the high-power radio base station, it is possible to set the amount of the second resources unusable by the high-power radio base station to a high level and to set the amount of the first resources usable by the high-power radio base station to a low level. Accordingly, depending on the actual usage status of radio base stations, it is possible to suitably control the amount of first resources usable at the high-power radio base station. When viewed from the standpoint of mobile terminals, fairness of resource allocation for mobile terminals connected to the high-power radio base station and mobile terminals connected to the low-power radio base station is improved, and it is possible to avoid deterioration of throughput, irrespective of which radio base station to which the mobile terminal is connected.

A radio communication system according to another aspect of the present invention includes: at least one high-power radio base station that forms a first cell and communicates with multiple mobile terminals; and at least one low-power radio base station connected with the high-power radio base station and communicates with multiple mobile terminals, the low-power radio base station having a transmission power less than a transmission power of the high-power radio base station and forming a second cell within the first cell, the second cell being smaller than the first cell, the high-power radio base station being configured to execute wireless transmission to the mobile terminals using resources that are the same as resources used by the low-power radio base station, and being configured to collaborate with the low-power radio base station for inter-cell interference control. The high-power radio base station includes: a radio communicator configured to execute wireless communication with mobile terminals connected with the high-power radio base station; a resource setter configured to determine a ratio of the number of second resources at which the radio communicator of the high-power radio base station should stop radio transmission to the sum of the number of the second resources and the number of first resources at which the radio communicator of the high-power radio base station should execute radio transmission; and a communication controller configured to execute radio transmission at the first resources and to stop radio transmission at the second resources in accordance with the ratio determined by the resource setter or a modified ratio resulting from modification of the ratio. The resource setter is configured to determine the ratio on the basis of a first number and a second number, the first number being the number of mobile terminals that are assumed to be connected with the high-power radio base station, rather than the low-power radio base station, when cell range expansion is not applied, but are connected with the low-power radio base station by virtue of application of cell range expansion, the second number being the number of mobile terminals connected with the high-power radio base station when cell range expansion is applied, the resource setter being configured to determine the ratio in such a manner that greater the proportion of the second number to the first number, the smaller the ratio.

The first number is the number of mobile terminals actually located at the edge of the cell of the low-power radio base station (mobile terminals that are assumed to be connected with the high-power radio base station, rather than the low-power radio base station if cell range expansion is not applied, but have been connected with the low-power radio base station by virtue of expansion of the second cell by application of cell range expansion). The first number can be considered to correspond to the second resources at which the high-power radio base station should stop radio transmission. The second number is the number of mobile terminals that have actually been connected with the high-power radio base station when cell range expansion is applied. The second number can be considered to correspond to the first resources at which the high-power radio base station should execute radio transmission. According to this aspect, it is possible to set the ratio of the number of the second resources to the sum of the number of the first resources and the number of the second resources in such a manner that the greater the proportion of the second number to the first number, the smaller the ratio. In summary, in a case in which there are few mobile terminals located at the edge of the cell of the low-power radio base station and utilize the second resources and there are many mobile terminals utilizing the high-power radio base station, it is possible to set the amount of the second resources unusable by the high-power radio base station to a low level and to set the amount of the first resources usable by the high-power radio base station to a high level. On the other hand, in a case in which there are many mobile terminals located at the edge of the cell of the low-power radio base station and utilize the second resources and there are few mobile terminals utilizing the high-power radio base station, it is possible to set the amount of the second resources unusable by the high-power radio base station to a high level and to set the amount of the first resources usable by the high-power radio base station to a low level. Accordingly, depending on the actual usage status of radio base stations, it is possible to suitably control the amount of first resources usable at the high-power radio base station. When viewed from the standpoint of mobile terminals, fairness of resource allocation for mobile terminals connected to the high-power radio base station and mobile terminals connected to the low-power radio base station is improved, and it is possible to avoid deterioration of throughput, irrespective of which radio base station to which the mobile terminal is connected.

Furthermore, the resource setter may determine the ratio on the basis of an actual usage ratio of the resources at the high-power radio base station, in such a manner that the lower the usage ratio, the smaller the ratio.

In this case, in a case in which the usage ratio of resources at the high-power radio base station is low, by intentionally decreasing the ratio of the second resources (increasing the ratio of the first resources usable by the high-power radio base station), the high-power radio base station can quickly send downlink traffic. After completion of transmission of downlink traffic from the high-power radio base station, there is no interference to mobile terminals connected to the low-power radio base station caused by radio waves from the high-power radio base station not only at the second resources, but also at the first resources. That is, at each cycle of the pattern of the first and second resources, after completion of transmission of downlink traffic from the high-power radio base station, the first resources are equivalent to the second resources for mobile terminals connected to the low-power radio base station, and the low-power radio base station can utilize the first resources for radio transmission to any of mobile terminals. As a result, at each cycle of the pattern of the first and second resources, after completion of transmission of downlink traffic from the high-power radio base station, the low-power radio base station can quickly send downlink traffic (it is possible to improve throughput of the low-power radio base station).

The radio communication system may include multiple high-power radio base stations and multiple low-power radio base stations. Each of some of the low-power radio base stations may be a common low-power radio base station configured to communicate with two high-power radio base station including a first high-power radio base station and a second high-power radio base station. Each of the multiple high-power radio base station may be configured to communicate with multiple common low-power radio base stations. Each of the multiple high-power radio base stations may include the radio communicator, the resource setter, and the communication controller, in which the resource setter may temporarily determine the ratio at each predetermined cycle. The common low-power radio base station may include a minimum value selector for selecting a minimum value among the ratio determined temporarily at the resource setter of the first high-power radio base station and the ratio determined temporarily at the resource setter of the second high-power radio base station; and a minimum value reporter for reporting the minimum value to the first high-power radio base station and the second high-power radio base station. The first high-power radio base station may include a minimum value receiver for receiving the multiple minimum values from the multiple common low-power radio base stations, respectively, in which the resource setter of the first high-power radio base station may adopt a minimum value among the ratio that is currently determined by the resource setter of the first high-power radio base station and the multiple previous minimum values received at the minimum value receiver, as the modified ratio with which the communication controller of the first high-power radio base station should comply. The second high-power radio base station may include a minimum value receiver for receiving the multiple minimum values from the multiple common low-power radio base stations, respectively, in which the resource setter of the second high-power radio base station may adopt a minimum value among the ratio that is currently determined by the resource setter of the second high-power radio base station and the multiple previous minimum values received at the minimum value receiver, as the modified ratio with which the communication controller of the second high-power radio base station should comply.

In a case in which multiple neighboring high-power radio base stations use different ratios, mobile terminals communicating with the low-power radio base station within the first cell in which the greater ratio is used are likely to be subject to interference caused by signals transmitted from a neighboring high-power radio base station although such mobile terminals receives signals at the second resource in the first cell. In particular, when the difference of ratios of multiple neighboring high-power radio base stations is great, this is a serious concern. In a case in which the resource setter of the high-power radio base station adopts a minimum value among the ratio that is currently determined by the resource setter of the high-power radio base station and the multiple previous minimum values received at the minimum value receiver, as the modified ratio with which the communication controller of the high-power radio base station should comply, it is possible to minimize the difference in ratios (modified ratios) used in neighboring high-power radio base stations, and to reduce or prevent the aforementioned problem of interference caused by another macro base station.

The radio communication system may include multiple high-power radio base stations, in which each of the multiple high-power radio base stations may include the radio communicator, the resource setter, and the communication controller, in which the resource setter may temporarily determine the ratio at each predetermined cycle. The resource setter of each of the multiple high-power radio base stations may select a minimum value among the ratio that is currently determined by the resource setter and multiple minimum values determined in the past at a neighboring high-power radio base station located near the high-power radio base station with which the resource setter is provided, and may adopt the selected minimum value as the modified ratio with which the communication controller of the second high-power radio base station should comply.

Again in this case, it is possible to minimize the difference in ratios (modified ratios) used in neighboring high-power radio base stations, and to reduce or prevent the aforementioned problem of interference caused by another macro base station.

The radio communication system may include multiple high-power radio base stations and multiple low-power radio base stations. Each of some of the low-power radio base stations may be a common low-power radio base station configured to communicate with two high-power radio base stations including a first high-power radio base station and a second high-power radio base station. Each of the multiple high-power radio base station may be configured to communicate with multiple common low-power radio base stations. Each of the multiple high-power radio base stations may include the radio communicator, the resource setter, and the communication controller, in which the resource setter may temporarily determine the ratio at each predetermined cycle. The common low-power radio base station may include a minimum value selector for selecting a minimum value among the ratio determined temporarily at the resource setter of the first high-power radio base station and the ratio determined temporarily at the resource setter of the second high-power radio base station; and a minimum value reporter for reporting the minimum value to the first high-power radio base station and the second high-power radio base station. The first high-power radio base station may include a minimum value receiver for receiving the multiple minimum values from the multiple common low-power radio base stations, respectively, in which the resource setter of the first high-power radio base station may adopt an average value or a median value of the ratio that is currently determined by the resource setter of the first high-power radio base station and the multiple previous minimum values received at the minimum value receiver, as the modified ratio with which the communication controller of the first high-power radio base station should comply. The second high-power radio base station may include a minimum value receiver for receiving the multiple minimum values from the multiple common low-power radio base stations, respectively, in which the resource setter of the second high-power radio base station may adopt an average value or a median value of the ratio that is currently determined by the resource setter of the second high-power radio base station and the multiple previous minimum values received at the minimum value receiver, as the modified ratio with which the communication controller of the second high-power radio base station should comply.

Again in this case, it is possible to minimize the difference in ratios (modified ratios) used in neighboring high-power radio base stations, and to reduce or prevent the aforementioned problem of interference caused by another macro base station.

The radio communication system may include multiple high-power radio base stations, in which each of the multiple high-power radio base stations may include the radio communicator, the resource setter, and the communication controller, in which the resource setter may temporarily determine the ratio at each predetermined cycle. The resource setter of each of the multiple high-power radio base stations may calculate an average value or a median value of the ratio that is currently determined by the resource setter and multiple minimum values determined in the past at a neighboring high-power radio base station located near the high-power radio base station with which the resource setter is provided, and may adopt the calculated average value or median value as the modified ratio with which the communication controller of the second high-power radio base station should comply.

Again in this case, it is possible to minimize the difference in ratios (modified ratios) used in neighboring high-power radio base stations, and to reduce or prevent the aforementioned problem of interference caused by another macro base station.

The radio communication system may include multiple high-power radio base stations and multiple low-power radio base stations. Each of some of the low-power radio base stations may be a common low-power radio base station configured to communicate with two high-power radio base station including a first high-power radio base station and a second high-power radio base station. Each of the multiple high-power radio base station may be configured to communicate with multiple common low-power radio base stations. Each of the multiple high-power radio base stations may include the radio communicator, the resource setter, and the communication controller, in which the resource setter may temporarily determine the ratio at each predetermined cycle. The common low-power radio base station may include a minimum value selector for selecting a minimum value among the ratio determined temporarily at the resource setter of the first high-power radio base station and the ratio determined temporarily at the resource setter of the second high-power radio base station; and a minimum value reporter for reporting the minimum value to the first high-power radio base station and the second high-power radio base station. The first high-power radio base station may include a minimum value receiver for receiving the multiple minimum values from the multiple common low-power radio base stations, respectively, in which the resource setter of the first high-power radio base station may adopt a value within a predetermined range from a minimum value among the ratio that is currently determined by the resource setter of the first high-power radio base station and the multiple previous minimum values received at the minimum value receiver, as the modified ratio with which the communication controller of the first high-power radio base station should comply. The second high-power radio base station may include a minimum value receiver for receiving the multiple minimum values from the multiple common low-power radio base stations, respectively, in which the resource setter of the second high-power radio base station may adopt a value within a predetermined range from a minimum value among the ratio that is currently determined by the resource setter of the second high-power radio base station and the multiple previous minimum values received at the minimum value receiver, as the modified ratio with which the communication controller of the second high-power radio base station should comply.

Again in this case, it is possible to minimize the difference in ratios (modified ratios) used in neighboring high-power radio base stations, and to reduce or prevent the aforementioned problem of interference caused by another macro base station.

The radio communication system may include multiple high-power radio base stations, in which each of the multiple high-power radio base stations may include the radio communicator, the resource setter, and the communication controller, in which the resource setter may temporarily determine the ratio at each predetermined cycle. The resource setter of each of the multiple high-power radio base stations may select a minimum value among the ratio that is currently determined by the resource setter and multiple minimum values determined in the past at a neighboring high-power radio base station located near the high-power radio base station with which the resource setter is provided, and may adopt a value within a predetermined range from the selected minimum value as the modified ratio with which the communication controller of the second high-power radio base station should comply.

Again in this case, it is possible to minimize the difference in ratios (modified ratios) used in neighboring high-power radio base stations, and to reduce or prevent the aforementioned problem of interference caused by another macro base station.

According to one aspect of the present invention, a radio base station communicating with mobile terminals is configured to execute wireless transmission to the mobile terminals using resources that are the same as resources used by a low-power radio base station having a transmission power less than a transmission power of the radio base station and forming a second cell within a first cell formed by the radio base station, the radio base station being configured to collaborate with the low-power radio base station for inter-cell interference control. The radio base station includes: a radio communicator configured to execute wireless communication with mobile terminals connected with the radio base station; a resource setter configured to determine a ratio of the number of second resources at which the radio communicator should stop radio transmission to the sum of the number of the second resources and the number of first resources at which the radio communicator should execute radio transmission; and a communication controller configured to execute radio transmission at the first resources and to stop radio transmission at the second resources in accordance with the ratio determined by the resource setter or a modified ratio resulting from modification of the ratio. The resource setter is configured to determine the ratio on the basis of a first proportion and a second proportion, the first proportion being a proportion of the number of mobile terminals that are assumed to be connected with the radio base station, rather than the low-power radio base station, when cell range expansion is not applied, but are connected with the low-power radio base station by virtue of application of cell range expansion to the total number of mobile terminals located in the first cell and connected with the radio base station or the low-power radio base station, the second proportion being a proportion of the number of mobile terminals connected with the radio base station when cell range expansion is applied to the total number of mobile terminals located in the first cell and connected with the radio base station or the low-power radio base station, the resource setter being configured to determine the ratio in such a manner that the greater the proportion of the second proportion to the first proportion, the smaller the ratio.

According to another aspect of the present invention, a radio base station communicating with mobile terminals is configured to execute wireless transmission to the mobile terminals using resources that are the same as resources used by a low-power radio base station having a transmission power less than a transmission power of the radio base station and forming a second cell within a first cell formed by the radio base station, the radio base station being configured to collaborate with the low-power radio base station for inter-cell interference control. The radio base station includes: a radio communicator configured to execute wireless communication with mobile terminals connected with the radio base station; a resource setter configured to determine a ratio of the number of second resources at which the radio communicator should stop radio transmission to the sum of the number of the second resources and the number of first resources at which the radio communicator should execute radio transmission; and a communication controller configured to execute radio transmission at the first resources and to stop radio transmission at the second resources in accordance with the ratio determined by the resource setter or a modified ratio resulting from modification of the ratio. The resource setter is configured to determine the ratio on the basis of a first number and a second number, the first number being the number of mobile terminals that are assumed to be connected with the radio base station, rather than the low-power radio base station, when cell range expansion is not applied, but are connected with the low-power radio base station by virtue of application of cell range expansion, the second number being the number of mobile terminals connected with the radio base station when cell range expansion is applied, the resource setter being configured to determine the ratio in such a manner that the greater the proportion of the second number to the first number, the smaller the ratio.

DESCRIPTION OF EMBODIMENTS

With reference to the accompanying drawings, various embodiments according to the present invention will be described hereinafter.

First Embodiment

Figure 1:
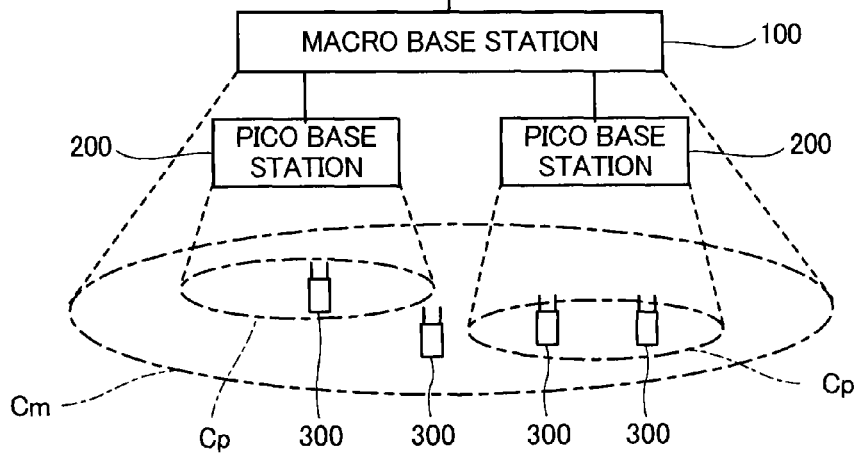
FIG. 1 is a schematic view showing a radio communication system according to a first embodiment of the present invention.

FIG. 1 is a schematic view showing a radio communication system according to a first embodiment of the present invention. The radio communication system includes a macro base station (macro eNodeB (evolved Node B)) 100 and pico base stations (pico eNodeBs) 200.

Communication elements in the radio communication system (the macro base station 100, the pico base stations 200, the mobile terminals 300) conduct radio communication in compliance with a predetermined radio access technology, e.g., LTE (Long Term Evolution) in 3GPP (Third Generation Partnership Project). In this embodiment, the radio communication system operates in compliance with the LTE, but it is not intended to limit the technical scope of the present invention. The present invention can be used with other radio access technologies, such as, for example, WiMAX (Worldwide Interoperability for Microwave Access) stipulated in IEEE 802.16 with necessary design modifications.

The macro base station (high-power radio base station) 100 is connected with the pico base stations (low-power radio base station) 200 via radio or cable. The macro base station 100 forms a macro cell (first cell) Cm, whereas each pico base station 200 forms a pico-cell Cp (second cell). Each pico-cell Cp is a cell formed within a macro cell Cm formed by the macro base station 100 to which the pico base station 200 that forms the pico-cell Cp is connected. Multiple pico-cell Cp may be formed within a single macro cell Cm.

Each of the base stations (the macro base station 100 and the pico base stations 200) can perform radio communication with user mobile terminals (UEs, user equipment) 300 visiting the cell of the base station itself. In other words, each mobile terminal 300 can perform radio communication with one or more base stations (the macro base station 100 and one of the pico base stations 200 if any) corresponding to one or more cells C (the macro cell Cm and one of the pico-cells Cp if any) at which the mobile terminal 300 itself is visiting.

Radio transmission capability (maximum transmission power, average transmission power, etc.) of the macro base station 100 is higher than that of pico base stations 200. Therefore, the macro base station 100 can perform wireless communication with a more distant mobile station 300. Consequently, the macro cell Cm is larger than pico-cells Cp in area. For example, the radius of the macro cell Cm is from several hundred meters to several tens of kilometers, whereas the radius of the pico-cell Cp is from several meters to several tens of meters.

As will be understood from the above description, the macro base station 100 and the pico base station 200 in the radio communication system constitute a heterogeneous network in which multiple types of radio base stations having different transmission powers (transmission capabilities) are deployed in a multi-layered way.

Since the pico-cells Cp are formed in a multi-layered way (i.e., overlaid) inside the macro cell Cm, when the mobile terminal 300 is visiting the pico-cell Cp, it will be understood that the mobile terminal 300 can perform radio communication with at least one of the pico base stations 200 defining the pico-cells Cp and the macro base station 100 defining the macro cell Cm that includes the pico-cells Cp.

The scheme for radio communication between each base station and each mobile terminal 300 may be freely chosen. For example, OFDMA (Orthogonal Frequency Division Multiple Access) may be adopted for downlink, whereas SC-FDMA (Single-Carrier Frequency Division Multiple Access) may be adopted for uplink.

Figure 2:
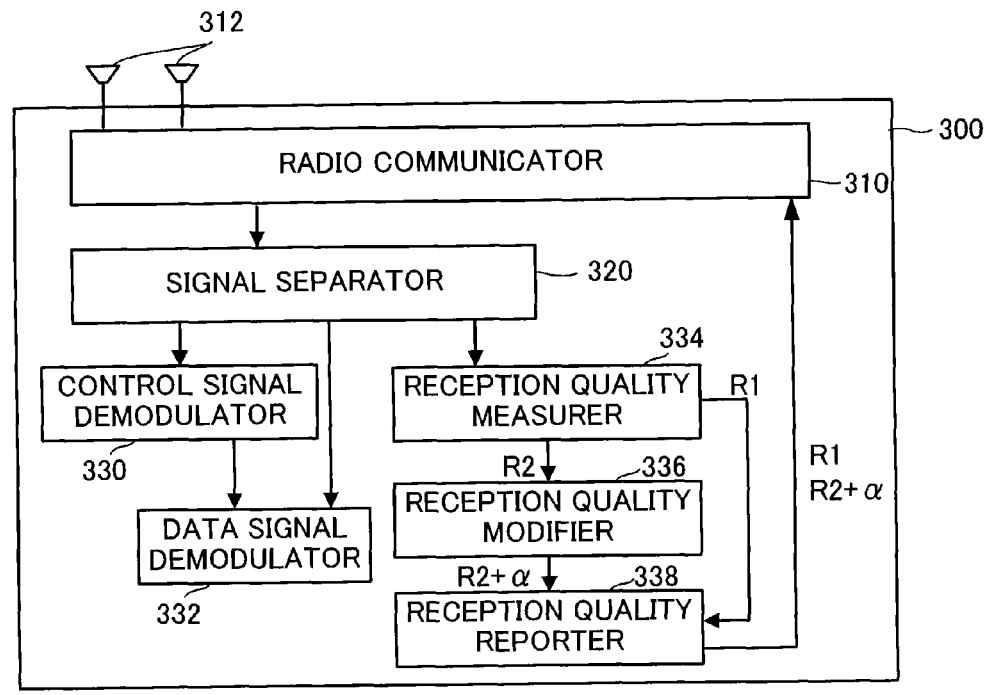
FIG. 2 is a block diagram showing the structure of a mobile terminal according to the first embodiment of the present invention.

FIG. 2 is a block diagram showing the structure of the mobile terminal 300 according to the first embodiment of the present invention. The mobile terminal 300 includes at least one transceiving antenna 312, a radio communicator 310, a signal separator 320, a control signal demodulator 330, a data signal demodulator 332, a reception quality measurer 334, a reception quality modifier 336, and a reception quality reporter 338. For the purpose of facilitating understanding, output devices for outputting sound, image, etc., and input devices for accepting user instructions are omitted in FIG. 2. As shown in FIG. 2, although the mobile terminal 300 has multiple transceiving antennas 312, mobile terminal 300 may have at least one reception dedicated antenna and at least one transmission dedicated antenna.

The radio communicator 310 is an element for executing radio communication with base stations (the macro base station 100 and the pico base stations 200), and includes a reception circuit for converting radio waves from a base station received at the transceiving antenna 312 to electrical signals, and a transmission circuit for converting electrical signals, such as a voice signal, to radio signals and sending them from the transceiving antenna 312. The radio communicator 310 receives access cell information from the macro base station 100 or the pico base station 200 forming the macro cell Cm or the pico cell Cp where the mobile terminal 300 is visiting. The access cell information is information indicating the radio base station (macro base station 100 or pico base station 200) to which the mobile terminal 300 should be connected. In accordance with the access cell information, the mobile terminal 300 communicates with the access point radio base station.

The signal separator 320, the control signal demodulator 330, the data signal demodulator 332, the reception quality measurer 334, the reception quality modifier 336, and the reception quality reporter 338 are functional blocks accomplished by the fact that a CPU (central processing unit, not shown) in the mobile terminal 300 executes a computer program stored in a memory (not shown) and operates in accordance with the computer program.

The signal separator 320 selects signals destined for the mobile terminal 300 from among signals processed by the radio communicator 310, and separates the signals into the control signal, the data signal, and the reference signal. The control signal demodulator 330 demodulates the control signal. The data signal demodulator 332 refers to the demodulated control signal, identifies resources used for transmission of the data signal, and demodulates the data signal. On the basis of the reference signal, the reception quality measurer 334 executes measurement of reception quality. The reception quality measurer 334 measures not only the quality of the reference signal from the desired radio base station to which the mobile terminal 300 is connected, but also the quality of the reference signal from a neighboring radio base station near the desired radio base station. Details of functions of the reception quality measurer 334, the reception quality modifier 336, and the reception quality reporter 338 will be described later.

Figure 3:
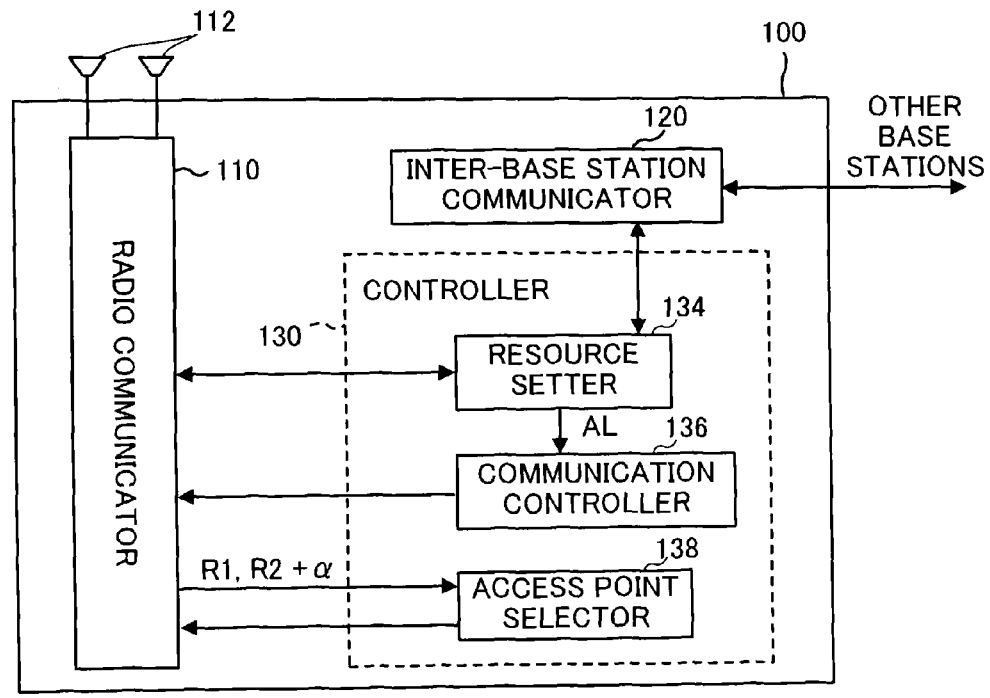
FIG. 3 is a block diagram showing the structure of a macro base station according to the first embodiment of the present invention.

FIG. 3 is a block diagram showing the structure of a macro base station 100 according to the first embodiment of the present invention. The macro base station 100 includes at least one transceiving antenna 112, a radio communicator 110, an inter-base station communicator 120, and a controller 130. As shown in FIG. 3, although the macro base station 100 has multiple transceiving antenna 112, the macro base station 100 may have at least one reception dedicated antenna and at least one transmission dedicated antenna.

The radio communicator 110 is an element for executing radio communication with mobile terminals 300, and includes a reception circuit for converting radio waves received at the transceiving antenna 112 from the mobile terminal 300 to electrical signals, and a transmission circuit for converting electrical signals, such as a voice signal, to radio signals and sending them from the transceiving antenna 112. The radio communicator 110 transmits a radio signal indicating the access cell information to each mobile terminal 300 visiting the macro base station 100.

The inter-base station communicator 120 is an element for executing communication with other base stations (other macro base stations 100 and the pico base stations 200), and exchanges electrical signals with other base stations. In a case in which the macro base station 100 executes wireless communication with other radio base stations, the radio communicator 110 may be used as the inter-base station communicator 120.

The controller 130 includes a resource setter 134, a communication controller 136, and an access point selector 138. The controller 130, and the resource setter 134, the communication controller 136, and the access point selector 138 contained in the controller 130 are functional blocks accomplished by the fact that a CPU in the macro base station 100 executes a computer program stored in a memory (not shown) and operates in accordance with the computer program. Details of operations of the controller 130 will be described later.

Figure 4:
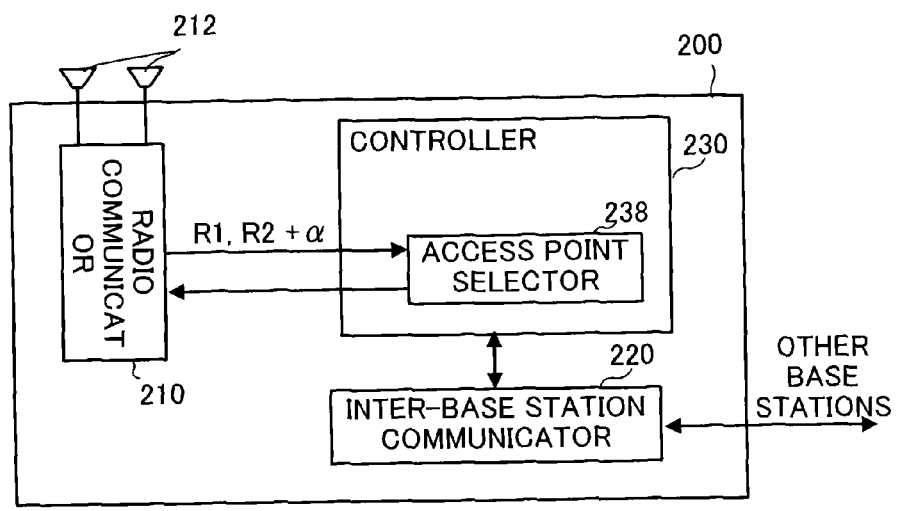
FIG. 4 is a block diagram showing the structure of a pico base station according to the first embodiment of the present invention.

FIG. 4 is a block diagram showing the structure of the pico base station 200 according to the first embodiment of the present invention. The pico base station 200 includes at least one transceiving antenna 212, a radio communicator 210, an inter-base station communicator 220, and a controller 230. As shown in FIG. 4, although the pico base station 200 has multiple transceiving antennas 212, the pico base station 200 may have at least one reception dedicated antenna and at least one transmission dedicated antenna.

The radio communicator 210 is an element for executing radio communication with mobile terminals 300, and includes a reception circuit for converting radio waves received at the transceiving antenna 212 from the mobile terminal 300 to electrical signals, and a transmission circuit for converting electrical signals, such as a voice signal, to radio signals and sending them from the transceiving antenna 212.

The inter-base station communicator 220 is an element for executing communication with the macro base station 100, to which the pico base station 200 itself is connected, and with other radio base stations, and exchanges electrical signals with the macro base station 100 and other radio base stations. In a case in which the pico base station 200 executes wireless communication with the macro base station 100 and other radio base stations, the radio communicator 210 may be used as the inter-base station communicator 220.

The controller 230 of the pico base station 200 includes an access point selector 238. The controller 230 of the pico base station 200 and the access point selector 238 in the controller 230 are functional blocks accomplished by the fact that a CPU in the pico base station 200 executes a computer program stored in a memory (not shown) and operates in accordance with the computer program. Details of operations of the controller 230 will be described later.

Cell range expansion (CRE) used in the radio communication system will be described. Each reception quality measurer 334 of the mobile terminal 300 measures, as reception qualities of radio waves, the reception power (for example, the reference signal reception power (RSRP)) of radio waves received from the desired radio base station to which the mobile terminal 300 is connected and the reception power (for example, reference signal reception power) of radio waves received from another radio base station to which the mobile terminal 300 is not connected. In the heterogeneous network, the reception quality measurer 334 measures the reception power of radio waves received from the macro base station 100 and the reception power of radio waves received from the pico base station 200. Regardless whether the macro base station 100 is the desired radio base station or not, let us assume that the reception power value of radio waves from the macro base station 100 is a first reception power value P1, whereas let us assume that the reception power value of radio waves from the pico base station 200 is a second reception power value P2.

The reception quality modifier 336 of each mobile terminal 300 increases the second reception power value R2 of radio waves from the pico base station 200 with the use of a predetermined offset value (bias value) α. For example, α may be simply added to R2, or α may be added to R2 in the units of dB. In any event, by this processing, the reception quality of radio waves from the pico base station 200 is seemingly improved. The second reception power value R2 thus modified will be called the modified second reception power value (R2+α). The offset value a is stored, for example, in a memory (not shown) of the mobile terminal 300.

The reception quality reporter 338 of the mobile terminal 300 transmits a signal indicating a reception power result report including the first reception power value R1 and the modified second reception power value (R2+α) via the radio communicator 310 to the desired radio base station (macro base station 100 or pico base station 200).

If the desired radio base station for the mobile terminal 300 is the macro base station 100, the signal indicating the reception power result report is received by the radio communicator 110 of the macro base station 100. On the basis of the reception power result report of each mobile terminal 300, the access point selector 138 of the macro base station 100 selects the radio base station to which the mobile terminal 300 should be selected. In this case, the access point selector 138 selects the radio base station corresponding to the reception power value indicating the highest reception power (i.e., the reception quality value indicating the best reception quality) as the radio base station to which the mobile terminal 300 should be selected. More specifically, with respect to a mobile terminal 300, in a case in which the first reception power value R1 is greater than the modified second reception power value (R2+α), the access point selector 138 selects the macro base station 100 as the access point for the mobile terminal 300. With respect to a mobile terminal 300, in a case in which the modified second reception power value (R2+α) is greater than the first reception power value R1, the access point selector 138 selects the pico base station 200 as the access point for the mobile terminal 300.

The access point selector 138 transmits access cell information indicating the selected radio access point to the mobile terminal 300 connected with the macro base station 100. In addition, in a case in which the access point for the mobile terminal 300 should be altered, the access point selector 138 informs the involved radio base stations (for example, the pico base station 200 or another macro base station 100 neighboring) that the access point for the mobile terminal 300 should be altered, via the inter-base station communicator 120.

If the desired radio base station for the mobile terminal 300 is a pico base station 200, the signal indicating the reception power result report is received by the radio communicator 210 of the pico base station 200. On the basis of the reception power result report of each mobile terminal 300, the access point selector 238 of the pico base station 200 selects the radio base station to which the mobile terminal 300 should be selected. In this case, the access point selector 238 selects the radio base station corresponding to the reception power value indicating the highest reception power (i.e., the reception quality value indicating the best reception quality) as the radio base station to which the mobile terminal 300 should be selected. The selection scheme is the same as that executed by the access point selector 138 of the macro base station 100.

The access point selector 238 transmits access cell information indicating the selected radio access point to the mobile terminal 300 connected with the pico base station 200. In addition, in a case in which the access point for the mobile terminal 300 should be altered, the access point selector 238 informs the involved radio base stations (for example, the macro base station 100 or another macro base station 100 neighboring) that the access point for the mobile terminal 300 should be altered, via the inter-base station communicator 120.

The radio communicator 310 of the mobile terminal 300 receives the access cell information. In a case in which the access cell information indicates the radio base station to which the mobile terminal 300 has already been connected, the mobile terminal 300 maintains the connection. On the other hand, the access cell information indicates another radio base station, the mobile terminal 300 executes operation for connecting to the radio base station. For example, when the mobile terminal 300 is connected with the macro base station 100, and the mobile terminal 300 receives access cell information designating that the pico base station 200 is the access point, the mobile terminal 300 connects (offloads) the mobile terminal 300 itself to the designated pico base station 200.

As described above, as a result of modification of the reception power value R2 of radio waves from the pico base station 200 by the offset value a, the reception quality of radio waves from the pico base station 200 is seemingly improved. Therefore, the radius, and thus the range of the pico cell Cp, is expanded, so that the processing load of the macro base station 100 is reduced.

The eICIC used in the radio communication system will be described. The macro base station 100 is capable of executing wireless transmission to the mobile terminals 300 using resources (each identified by frequency and time) that are the same as resources used by the pico base stations 200 in the macro cell Cm, and is configured to collaborate with the pico base stations 200 for eICIC (enhanced inter-cell interference control).

Figure 5:
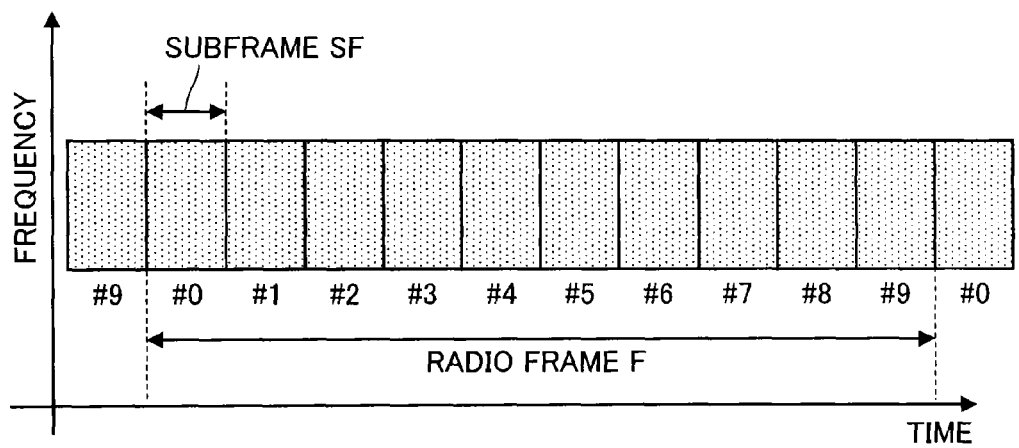
FIG. 5 is a view showing a format of the radio frame exchanged by communication elements in the radio communication system.

FIG. 5 is a view showing a format of the radio frame F exchanged by communication elements in the radio communication system. The radio frame F is a transmission unit of radio signals sent from each communication elements (the macro base station 100, the pico base stations 200, and the mobile terminals 300), and occupies a predetermined time length (for example, 10 milliseconds) and a predetermined bandwidth. By transmitting radio frames F continuously, a series of radio signals are constructed.

Each radio frame F contains multiple subframes SF. The subframe SF is a transmission unit occupying a time length (for example, 1 millisecond) that is shorter than that of the radio frame F, and can be numbered from number 0 (#0) in ascending order within one radio frame F.

Figure 6:
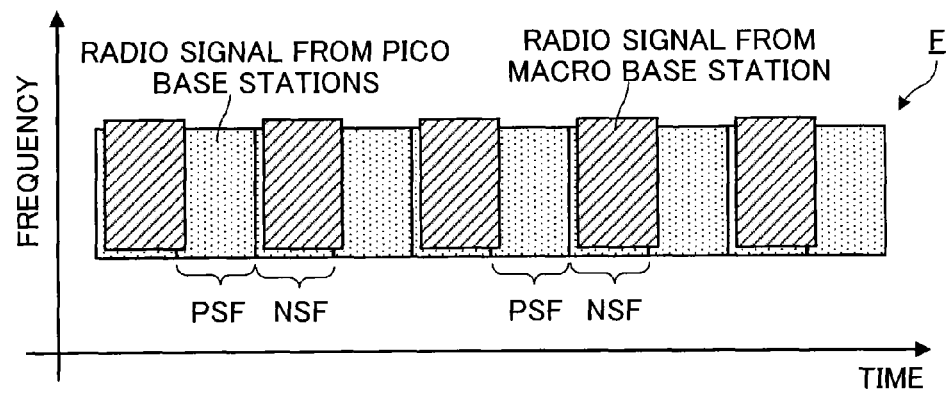
FIG. 6 is a schematic view showing time domain-based inter-cell interference control.

FIG. 6 is a schematic view for showing time domain-based inter-cell interference control. For purposes of explanation of eICIC, let us assume that a macro base station 100 and a pico base station 200 forming the pico cell Cp in the macro cell Cm formed by the macro base station 100 send radio signals (radio frame F) with the use of a common radio frame timing and a common frequency band. Here, "radio signals are sent with the use of a common radio frame timing" is meant to that the transmission start time of the radio frame F transmitted by the macro base station 100 is simultaneous with the transmission start time of the radio frame F transmitted by the pico base station 200. In other words, the radio communicator 110 of the macro base station 100 and the radio communicator 210 of the pico base station 200 can execute wireless communication in synchronization.

The radio signal from the macro base station 100 and the radio signal from the pico base station 200 are sent at the same frequency band, so as to interfere with each other. In particular, since the transmission power of the macro base station 100 is greater than the transmission power of the macro base station 100, the interference to the radio signal from the pico base station 200 resulting from the radio signal from the macro base station 100 is remarkably significant. Accordingly, if the radio signals are always continuously sent, it is difficult for the mobile terminal 300 of which the desired base station is the pico base station 200 to receive radio signals from the pico base station 200.

Accordingly, in the time domain-based eICIC, as shown in FIG. 6, whereas the pico base station 200 continuously executes downlink transmission, the macro base station 100 intermittently executes downlink transmission. For example, as shown in FIG. 6, the macro base station 100 switches execution and stopping transmission of its radio signal at a cycle of one subframe SF. The subframe SF at which the macro base station 100 stops transmission of the radio signal is called a protected subframe PSF since the radio signal from the pico base station 200 is protected from interference by the macro base station 100. On the other hand, the subframe SF at which the macro base station 100 executes transmission of the radio signal is called a non-protected subframe NSF.

At the protected subframes PSF at which the radio communicator 110 of the macro base station 100 does not transmit the radio signal, only the radio communicator 210 of the pico base station 200 transmits the radio signal. Thus, at the protected subframes PSF, the radio signal from the pico base station 200 is not subject to interference by the radio signal from the macro base station 100, so that the mobile terminals 300 visiting the pico cell Cp defined by the pico base station 200 can receive the radio signal from the pico base station 200 at a good quality.

Figure 7:
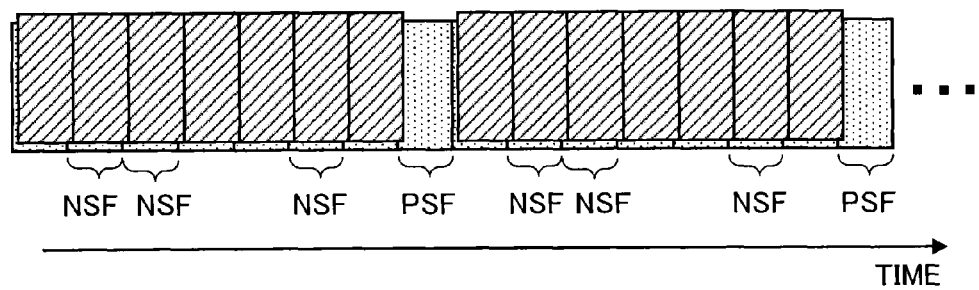
FIG. 7 is a view showing an occurrence pattern of subframes in the time domain-based inter-cell interference control that is different from FIG. 6.
Figure 8:
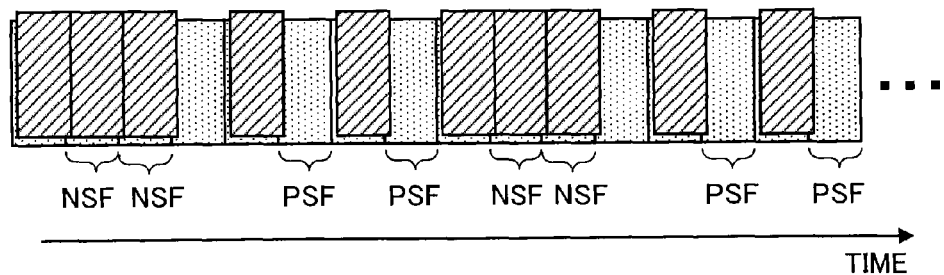
FIG. 8 is a view showing an occurrence pattern of subframes in the time domain-based inter-cell interference control that is different from FIGS. 6 and 7.

In FIG. 6, the protected subframes PSF and the non-protected subframes NSF alternately occur, but the occurrence pattern of protected subframes PSF and non-protected subframes NSF is not limited to that exemplified in FIG. 6. Rather, as shown in FIGS. 7 and 8, the occurrence pattern of protected subframes PSF and non-protected subframes NSF can be modified. The occurrence pattern is called an ABS (Almost Blank Subframe) pattern in the LTE (for example, 3GPP TS 36.300 V10.5.0, 3GPP TS 36.423 V11.0.0). The ABS pattern can be considered as an occurrence pattern of protected subframes PSF (second resources) in all subframes (all resources) that are usable by the macro base station 100 and the pico base station 200 containing both non-protected subframes NSF (first resources) at which the radio communicator 110 of the macro base station 100 should execute radio transmission and protected subframes PSF (second resources) at which the radio communicator 110 of the macro base station 100 should stop radio transmission.

In the ABS pattern shown in FIG. 7, one protected subframe PSF occurs in a cycle of 8 subframes. In other words, within 8 subframes, one subframe is a protected subframe PSF. With respect to this ABS pattern, the ratio of the number of protected subframes PSF (second resources) to the sum of the number of non-protected subframes NSF (first resources) at which the radio communicator 110 of the macro base station 100 should execute radio transmission and the number of protected subframes PSF (second resources) at which the radio communicator 110 of the macro base station 100 should stop radio transmission is 1/8. Hereinafter, this ABS pattern will be called the ABS pattern with ratio 1/8.

In the ABS pattern shown in FIG. 8, three protected subframes PSF occur in a cycle of 8 subframes. In other words, within 8 subframes, three subframes are protected subframes PSF. With respect to this ABS pattern, the ratio of the number of protected subframes PSF (second resources) to the sum of the number of non-protected subframes NSF (first resources) at which the radio communicator 110 of the macro base station 100 should execute radio transmission and the number of protected subframes PSF (second resources) at which the radio communicator 110 of the macro base station 100 should stop radio transmission is 3/8. Hereinafter, this ABS pattern will be called the ABS pattern with ratio 3/8. Similarly, the ABS pattern in which n subframes within 8 subframes are protected subframes PSF will be called the ABS pattern with ratio n/8 where n is zero or a positive integer.

This embodiment is based on the time domain-based eICIC, and the resource setter 134 of the macro base station 100 sets the ABS pattern on the basis of the parameters that will be described later. In other words, resource setter 134 sets the ratio of the second resources (protected subframes PSF) at which the radio communicator 110 of the macro base station 100 should stop radio transmission to a unit resource (radio frame F) occupying a predetermined time length and a predetermined frequency bandwidth. In further other words, the resource setter 134 sets the ratio of the number of protected subframes PSF (second resources) to the sum of the number of non-protected subframes NSF (first resources) at which the radio communicator 110 of the macro base station 100 should execute radio transmission and the number of protected subframes PSF (second resources) at which the radio communicator 110 of the macro base station 100 should stop radio transmission.

After setting the ABS pattern, i.e., the aforementioned ratio, the resource setter 134 generates resource allocation information AL on the basis of the ABS pattern. The resource allocation information AL is information indicating the ABS pattern (information indicating the number and the arrangement of protected subframes PSF). The resource setter 134 supplies the resource allocation information AL to the communication controller 136. On the basis of the resource allocation information AL, the communication controller 136 controls the radio communicator 110. In other words, the radio communicator 110 is controlled to execute wireless communication at non-protected subframes NSF set by the resource setter 134, and to stop wireless communication at protected subframes PSF set by the resource setter 134.

On the other hand, the controller 23 of the pico base station 200 executes downlink resource allocation for mobile terminals 300 connected with the pico base station 200, i.e., scheduling, for example, in accordance with a proportional fairness algorithm. Using a proportional fairness type scheduler results in that non-protected subframes NSF are mainly used for wireless communication with mobile terminals 300 located at the center of the pico cell Cp (mobile terminals 300 having been connected with the pico base station 200 without expansion of pico cell Cp by CRE) and in that protected subframes PSF are mainly used for wireless communication with mobile terminals 300 located at the edge of the pico cell Cp (mobile terminals 300 having been connected with the pico base station 200 by virtue of expansion of pico cell Cp by CRE).

Alternatively, the resource setter 134 of the macro base station 100 may send the resource allocation information AL via the inter-base station communicator 120 to the pico base station 200, and the inter-base station communicator 220 of the pico base station 200 may receive the resource allocation information AL and may execute resource allocation to the mobile terminal 300 on the basis of the resource allocation information. For example, the controller 230 may control the radio communicator 210, such that non-protected subframes NSF are mainly used for wireless communication with mobile terminals 300 located at the center of the pico cell Cp (mobile terminals 300 having been connected with the pico base station 200 without expansion of pico cell Cp by CRE). The controller 230 may also control the radio communicator 210, such that protected subframes PSF are mainly used for wireless communication to mobile terminals 300 located at the edge of the pico cell Cp (mobile terminals 300 having been connected with the pico base station 200 by virtue of expansion of pico cell Cp by CRE). As an index of the distance between the mobile terminal 300 and the pico base station 200, the modified second reception power value (R2+α) or the second reception power value R2 indicated in the reception power result report that is received by the pico base station 200 from the mobile terminal 300 may be used. The controller 230 may control the radio communicator 210, such that, for example, protected subframes PSF are used for wireless communication to mobile terminals 300 of which the second reception power value R2 is lower than a threshold. The controller 230 may also control the radio communicator 210, such that, for example, non-protected subframes NSF are used for wireless communication to mobile terminals 300 of which the second reception power value R2 is higher than the threshold.

Figure 9:
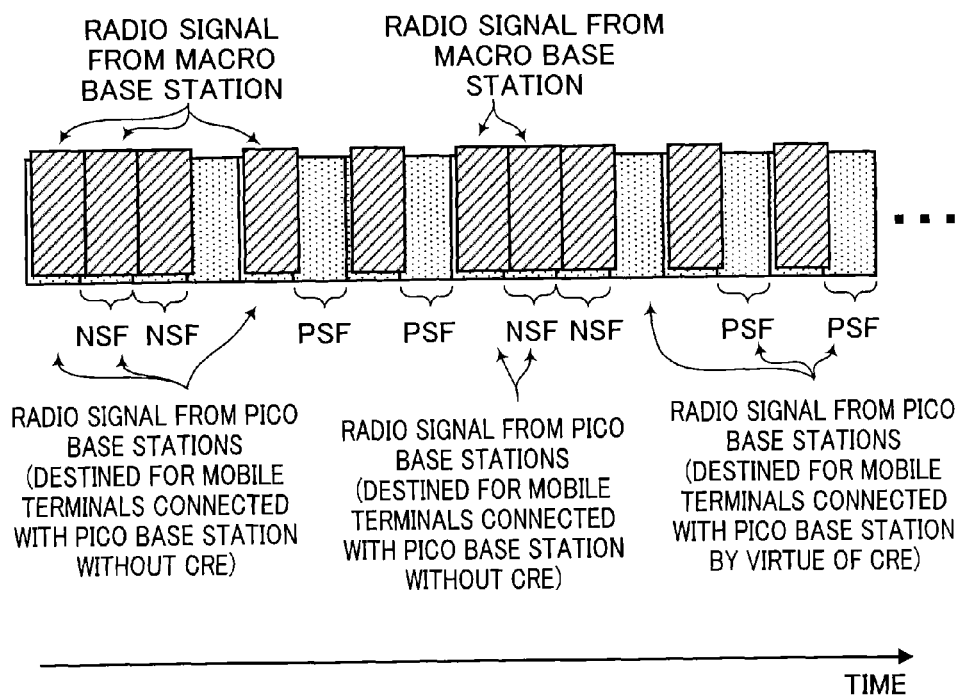
FIG. 9 is a schematic view showing purposes of protected subframes and non-protected subframes in the time domain-based inter-cell interference control.

FIG. 9 shows purposes of protected subframes PSF and non-protected subframes NSF. As described above, the radio signal from the macro base station 100 stops at non-protected subframes NSF, whereas the radio signal from the macro base station 100 is transmitted at protected subframes PSF. The pico base station 200 executes radio transmission mainly for mobile terminals 300 located at the center of the pico cell Cp (mobile terminals 300 having been connected with the pico base station 200 without expansion of pico cell Cp by CRE) at non-protected subframes NSF, and executes radio transmission mainly for mobile terminals 300 located at the edge of the pico cell Cp (mobile terminals 300 having been connected with the pico base station 200 by virtue of expansion of pico cell Cp by CRE) at protected subframes PSF.

In eICIC, resources usable by the macro base station are limited. In a case in which many mobile terminals 300 utilize the macro base station 100 and few mobile terminals 300 utilize pico base stations 200, it is undesirable to set the amount of the second resources (protected subframes PSF) unusable by the macro base station to a high level. On the other hand, in a case in which many mobile terminals 300 utilize pico base stations 200 and few mobile terminals 300 utilize the macro base station 100, it is undesirable to set the amount of the first resources (non-protected subframes NSF) usable by the macro base station to a high level.

Accordingly, the resource setter 134 of the macro base station 100 sets a ratio R of the number of protected subframes PSF to the sum of the number of non-protected subframes NSF and the number of protected subframes PSF, on the basis of a first proportion $(P_p(\alpha)-P_p(0))$ and a second proportion $P_m(\alpha)$. The first proportion $(P_p(\alpha)-P_p(0))$ is a proportion of the number of mobile terminals 300 that are assumed to be connected with the macro base station 100, rather than the pico base stations 200, when CRE is not applied, but have actually been connected with the pico base stations 200 by virtue of application of CRE to the total number of mobile terminals 300 located in the macro cell (the first cell) Cm and actually connected with the macro base station 100 or the pico base stations 200. The second proportion $P_m(\alpha)$ is a proportion of the number of mobile terminals 300 that have actually been connected with the macro base station 100 when CRE is applied to the total number of mobile terminals 300 located in the macro cell (the first cell) Cm and actually connected with the macro base station 100 or the pico base stations 200. The resource setter sets the ratio R in such a manner that the greater the proportion of the second proportion $P_m(\alpha)$ to the first proportion $(P_p(\alpha)-P_p(0))$, the smaller the ratio R.

A specific example of setting the ratio will be described. The resource setter 134 of the macro base station 100 calculates a provisional ratio r of the number of protected subframes PSF to the sum of the number of non-protected subframes NSF and the number of protected subframes PSF in the macro base station 100, in accordance with formula (1).

$$r = \frac{\beta(P_p(\alpha) - P_p(0))/N_{p/m}}{P_m(\alpha) + \beta(P_p(\alpha) - P_p(0))/N_{p/m}} \quad (1)$$

In formula (1), the meanings of the parameters are as follows:

$P_p(\alpha)$: the proportion of the number of user equipments 300 that have actually been connected with all pico base stations 200 in the macro cell Cm when the offset value for CRE is α dB to the total number of mobile terminals 300 located in the macro cell Cm and actually connected with the macro base station 100 or the pico base stations 200 (i.e., proportion of the number of mobile terminals 300 that have actually been connected with all pico base stations 200 in the macro cell Cm when CRE is applied to the total number of mobile terminals 300 located in the macro cell Cm and actually connected with the macro base station 100 or the pico base stations 200).

$P_p(0)$: the proportion of the number of user equipments 300 that have actually been connected with all pico base stations 200 in the macro cell Cm when the offset value for CRE is zero dB to the total number of mobile terminals 300 located in the macro cell Cm and actually connected with the macro base station 100 or the pico base stations 200 (i.e., proportion of the number of mobile terminals 300 that are assumed to be connected with all pico base stations 200 in the macro cell Cm when CRE is not applied to the total number of mobile terminals 300 located in the macro cell Cm and actually connected with the macro base station 100 or the pico base stations 200).

$P_m(\alpha)$: the proportion of the number of user equipments 300 that have actually been connected with the macro base station 100 when the offset value for CRE is α dB to the total number of mobile terminals 300 located in the macro cell Cm and actually connected with the macro base station 100 or the pico base stations 200 (i.e., proportion of the number of mobile terminals 300 that have actually been connected with the macro base station 100 when CRE is applied to the total number of mobile terminals 300 located in the macro cell Cm and actually connected with the macro base station 100 or the pico base stations 200).

$N_{p/m}$: the number of pico base stations 200 per macro base station 100.

β: a modification coefficient.

As long as CRE is applied, the proportion $P_p(\alpha)$ is the proportion of the number of all mobile terminals 300 that have actually been connected with pico base stations 200 to the total number of mobile terminals 300 located in the macro cell Cm and actually connected with the macro base station 100 or the pico base stations 200. The controller 130 of the macro base station 100 recognizes the number $N_m(\alpha)$ of mobile terminals actually connected to the macro base station 100. In other words, the controller 130 of the macro base station 100 serves as a counter for counting the number $N_m(\alpha)$. In addition, the controller 23 of each pico base station 200 recognizes the number $N_{pi}(\alpha)$ of mobile terminals 300 that have actually been connected with the pico base station 200. In other words, the controller 23 of each pico base station 200 serves as a counter for counting the number $N_{pi}(\alpha)$. The controller 23 of each pico base station 200 reports the number $N_{pi}(\alpha)$ to the controller 130 of the macro base station 100. The controller 130 serves as a proportion calculator for calculating the proportion $P_p(\alpha)$ in accordance with formula (2). The reason for calculating the summation (sigma) of the number $N_{pi}(\alpha)$ is that there may be multiple pico base stations 200 within the macro cell Cm of the macro base station 100.

$$P_p(\alpha) = \frac{\sum_{i=1}^{N_{p/m}} N_{pi}(\alpha)}{N_m(\alpha) + \sum_{i=1}^{N_{p/m}} N_{pi}(\alpha)} \quad (2)$$

The proportion $P_p(0)$ is the proportion of the number of mobile terminals actually located at the centers of the pico cells Cp (mobile terminals 300 having been connected with the pico base station 200 without expansion of pico cell Cp by CRE) to the total number of mobile terminals 300 located in the macro cell Cm and actually connected with the macro base station 100 or the pico base stations 200. The controller 23 of the pico base station 200 can distinguish mobile terminals actually located at the centers of the pico cells Cp from mobile terminals actually located at the edges of the pico cells Cp by comparing the second reception power value R2 with a threshold. More specifically, mobile terminals actually located at the centers of the pico cells Cp are mobile terminals 300 of which the second reception power value R2 is higher than the threshold, whereas mobile terminals actually located at the edges of the pico cells Cp are mobile terminals 300 of which the second reception power value R2 is lower than the threshold. The controller 23 of each pico base station 200 serves as a mobile terminal classifier for distinguishing mobile terminals 300 of which the second reception power value R2 is higher than the threshold from mobile terminals 300 of which the second reception power value R2 is lower than the threshold by comparing the second reception power value R2 with the threshold. The controller 23 of each pico base station 200 serves as a counter for counting the number $N_{pi}(0)$ of mobile terminals actually located at the center of the pico cell Cp of the pico base station 200, and reports the number $N_{pi}(0)$ to the controller 130 of the macro base station 100. The controller 130 serves as a proportion calculator for calculating the proportion $P_p(0)$ in accordance with formula (3).

$$P_p(0) = \frac{\sum_{i=1}^{N_{p/m}} N_{pi}(0)}{N_m(\alpha) + \sum_{i=1}^{N_{p/m}} N_{pi}(\alpha)} \quad (3)$$

The first proportion $(P_p(\alpha)-P_p(0))$ can be calculated from the proportions $P_p(\alpha)$ and $P_p(0)$. Thus, the controller 130 serves as a proportion calculator for calculating the first proportion $(P_p(\alpha)-P_p(0))$.

However, the first proportion $(P_p(\alpha)-P_p(0))$ may be calculated as follows: The first proportion $(P_p(\alpha)-P_p(0))$ is the proportion of the number of mobile terminals actually located at the edges of the pico cells Cp (mobile terminals 300 that are assumed to be connected with the macro base station 100, rather than pico base stations 200 if CRE is not applied, but have been connected with pico base stations 200 by virtue of expansion of pico cells Cp by application of CRE) to the total number of mobile terminals 300 located in the macro cell Cm and actually connected with the macro base station 100 or the pico base stations 200. The controller 23 of the pico base station 200 can distinguish mobile terminals 300 located at the edge of the pico cell Cp from mobile terminals 300 located at the center of the pico cell Cp by comparing the second reception power value R2 with a threshold. More specifically, mobile terminals actually located at the centers of the pico cells Cp are mobile terminals 300 of which the second reception power value R2 is higher than the threshold, whereas mobile terminals actually located at the edges of the pico cells Cp are mobile terminals 300 of which the second reception power value R2 is lower than the threshold. The controller 23 of each pico base station 200 serves as a mobile terminal classifier for distinguishing mobile terminals 300 of which the second reception power value R2 is higher than the threshold from mobile terminals 300 of which the second reception power value R2 is lower than the threshold by comparing the second reception power value R2 with the threshold. The controller 23 of each pico base station 200 may serve as a counter for counting the number $N_{ppi}$ of mobile terminals actually located at the edge of the pico cell Cp of the pico base station 200, and may report the number $N_{ppi}$ to the controller 130 of the macro base station 100. The controller 130 may serve as a proportion calculator for calculating the first proportion $(P_p(\alpha)-P_p(0))$ in accordance with formula (4).

$$P_p(\alpha) - P_p(0) = \frac{\sum_{i=1}^{N_{p/m}} N_{ppi}}{N_m(\alpha) + \sum_{i=1}^{N_{p/m}} N_{pi}(\alpha)} \quad (4)$$

As long as CRE is applied, the second proportion $P_m(\alpha)$ is the proportion of the number of all mobile terminals 300 that have actually been connected with the macro base station 100 to the total number of mobile terminals 300 located in the macro cell Cm and actually connected with the macro base station 100 or the pico base stations 200. The controller 130 may serve as a proportion calculator for calculating the second proportion $P_m(\alpha)$ in accordance with formula (5).

$$P_m(\alpha) = \frac{N_m(\alpha)}{N_m(\alpha) + \sum_{i=1}^{N_{p/m}} N_{pi}(\alpha)} \quad (5)$$

The first proportion $(P_p(\alpha)-P_p(0))$ and the second proportion $P_m(\alpha)$, which are parameters in formula (1), are thus calculated. Since the remaining parameters $N_{p/m}$ and $\beta$ are constants, the resource setter 134 can calculate the aforementioned provisional ratio r in accordance with formula (1).

In formula (1), the provisional ratio r may be a continuous value, but the actual ratio of protected subframes PSF is a discrete value (0/8, 1/8, 2/8, 3/8, . . . in the above example). Accordingly, the resource setter 134 calculates the ratio R (discrete value) of the number of protected subframes PSF to the sum of the number of non-protected subframes NSF and the number of protected subframes PSF, in accordance with formula (6) that uses the floor function.

$$R = \frac{\lfloor L \cdot r \rfloor}{L} \quad (6)$$

Alternatively, the resource setter 134 may calculate the ratio R (discrete value) of the number of protected subframes PSF to the sum of the number of non-protected subframes NSF and the number of protected subframes PSF, in accordance with formula (7) that uses the ceiling function.

$$R = \frac{\lceil L \cdot r \rceil}{L} \quad (7)$$

In formulae (6) and (7), L represents the cycle of the ABS pattern (the cycle is 8 in the above example). The resource setter 134 can thus calculate the ratio R (discrete value, 0/8, 1/8, 2/8, 3/8, . . . in the above example) of the number of protected subframes PSF to the sum of the number of non-protected subframes NSF and the number of protected subframes PSF, and sets the ABS pattern corresponding to the ratio R.

With reference to FIG. 9 again, the technical significance of formula (1) will be described. As will be apparent from FIG. 9, non-protected subframes NSF are periods during which the radio signal is sent from the macro base station 100. Protected subframes PSF are periods during which pico base stations 200 send radio signals destined mainly for mobile terminals 300 that are assumed to be connected with the macro base station 100, rather than pico base stations 200 if CRE is not applied, but have actually been connected with pico base stations 200 by virtue of application of CRE (mobile terminals actually located at the edges of the pico cells Cp). The ratio R that should be set by the access point selector 138 is the ratio of the number of protected subframes PSF to the sum of the number of non-protected subframes NSF and the number of protected subframes PSF.

As described above, the second proportion $P_m(\alpha)$ is the proportion of the number of mobile terminals 300 that have actually been connected with the macro base station 100 when CRE is applied to the total number of mobile terminals 300 located in the macro cell Cm and actually connected with the macro base station 100 or the pico base stations 200. The second proportion $P_m(\alpha)$ can be considered to correspond to non-protected subframes NSF. The first proportion $(P_p(\alpha) - P_p(0))$ is the proportion of the number of mobile terminals 300 actually located at the edges of the pico cells Cp (mobile terminals 300 that are assumed to be connected with the macro base station 100, rather than pico base stations 200 if CRE is not applied, but have been connected with pico base stations 200 by virtue of expansion of pico cells Cp by application of CRE) to the total number of mobile terminals 300 located in the macro cell Cm and actually connected with the macro base station 100 or the pico base stations 200. The first proportion $(P_p(\alpha) - P_p(0))$ can be considered to correspond to protected subframes PSF.

Therefore, it is preferable that the provisional ratio r be calculated in accordance with formula (8).

$$r = \frac{(P_p(\alpha) - P_p(0))}{P_m(\alpha) + (P_p(\alpha) - P_p(0))} \quad (8)$$

In other words, it is preferable that the modification coefficient β in formula (1) be simply equal to $N_{p/m}$.

However, it is possible to determine a more appropriate modification coefficient β, depending on deployment of the pico base stations 200, radio wave propagation environment around respective pico base stations 200, and other factors. A preferable formula produced as a result of consideration of these factors is formula (1).

According to formula (1), it is possible to set the ratio R of the number of protected subframes PSF to the sum of the number of non-protected subframes NSF and the number of protected subframes PSF in such a manner that the greater the proportion of the second proportion $P_m(\alpha)$ to the first proportion $(P_p(\alpha) - P_p(0))$, the smaller the ratio R. In summary, in a case in which there are few mobile terminals 300 located at edges of the cells of the pico base stations and utilize protected subframes PSF and there are many mobile terminals 300 utilizing the macro base station 100, it is possible to set the amount of the second resources (protected subframes PSF) unusable by the macro base station 100 to a low level and to set the amount of the first resources (non-protected subframes NSF) usable by the macro base station 100 to a high level. On the other hand, in a case in which there are many mobile terminals 300 located at edges of the cells of the pico base stations and utilize protected subframes PSF and there are few mobile terminals 300 utilizing the macro base station 100, it is possible to set the amount of the second resources (protected subframes PSF) unusable by the macro base station 100 to a high level and to set the amount of the first resources (non-protected subframes NSF) usable by the macro base station 100 to a low level. Accordingly, depending on the actual usage status of radio base stations 100 and 200, it is possible to suitably control the amount of resources usable at the macro base station 100. When viewed from the standpoint of mobile terminals 300, fairness of resource allocation for mobile terminals 300 connected to the macro base station 100 and mobile terminals 300 connected to pico base stations 200 is improved, and it is possible to avoid deterioration of throughput, irrespective of which radio base station with which the mobile terminal 300 is connected.

In this embodiment, the macro base station 100 sets an ABS pattern utilized in the macro cell Cm, on the basis of the number of mobile terminals 300 located in the entire macro cell Cm of the macro base station 100 and connected with the macro base station 100, and the number of mobile terminals 300 connected with the pico base stations 200 located in the entire macro cell Cm. However, the macro base station 100 may set an ABS pattern utilized in a sector in the macro cell Cm of the macro base station 100, on the basis of the number of mobile terminals 300 located in the sector and connected with the macro base station 100, and the number of mobile terminals 300 connected with the pico base stations 200 located in the sector. That is to say, the macro base station 100 may set an appropriate ABS pattern for respective sectors constituting the macro cell Cm.

Second Embodiment

Next, the second embodiment of the present invention will be described. The second embodiment is different from the above-described first embodiment in the manner of setting ratio R achieved by the resource setter 134 of the macro base station 100. In the second embodiment, structures of the macro base station 100, the pico base station 200, and the mobile terminal 300 may be the same as those in the first embodiment. Features that are the same as those in the first embodiment will not be described here in detail.

In the second embodiment, the resource setter 134 of the macro base station 100 sets the ratio R of the number of protected subframes PSF to the sum of the number of non-protected subframes NSF and the number of protected subframes PSF, on the basis of a first number ($N_p(\alpha)-N_p(0)$) and a second number $N_m(\alpha)$. The first number ($N_p(\alpha)-N_p(0)$) is the number of mobile terminals 300 that are assumed to be connected with the macro base station 100, rather than the pico base stations 200, when CRE is not applied, but have actually been connected with the pico base stations 200 by virtue of application of CRE. The second number $N_m(\alpha)$ is the number of mobile terminals 300 that have actually been connected with the macro base station 100 when CRE is applied. The resource setter sets the ratio R in such a manner that the greater the proportion of the second number $N_m(\alpha)$ to the first number ($N_p(\alpha)-N_p(0)$), the smaller the ratio R.

A specific example of setting the ratio will be described. The resource setter 134 of the macro base station 100 calculates a provisional ratio r of the number of protected subframes PSF to the sum of the number of non-protected subframes NSF and the number of protected subframes PSF in the macro base station 100, in accordance with formula (9).

$$r = \frac{\beta(N_p(\alpha) - N_p(0))/N_{p/m}}{N_m(\alpha) + \beta(N_p(\alpha) - N_p(0))/N_{p/m}} \quad (9)$$

In formula (9), meanings of the parameters are as follows:

$N_p(\alpha)$: the number of user equipments 300 that have actually been connected with all pico base stations 200 in the macro cell Cm of the macro base station 100 when the offset value for CRE is $\alpha$ dB (i.e., the number of mobile terminals 300 that have actually been connected with all pico base stations 200 in the macro cell Cm when CRE is applied).

$N_p(0)$: the number of user equipments 300 that have actually been connected with all pico base stations 200 in the macro cell Cm of the macro base station 100 when the offset value for CRE is zero dB (i.e., the number of mobile terminals 300 that are assumed to be connected with all pico base stations 200 in the macro cell Cm when CRE is not applied).

$N_m(\alpha)$: the number of user equipments 300 that have actually been connected with the macro base station 100 when the offset value for CRE is $\alpha$ dB (i.e., the number of mobile terminals 300 that have actually been connected with the macro base station 100 when CRE is applied).

$N_{p/m}$: the number of pico base stations 200 per macro base station 100.

$\beta$: a modification coefficient.

As long as CRE is applied, the second number $N_m(\alpha)$ is the number of all mobile terminals 300 that have actually been connected with the macro base station 100. The controller 130 of the macro base station 100 recognizes the number $N_m(\alpha)$ of mobile terminals actually connected to the macro base station 100. In other words, the controller 130 of the macro base station 100 serves as a counter for counting the number $N_m(\alpha)$.

As long as CRE is applied, the number $N_p(\alpha)$ is the number of all mobile terminals 300 that have actually been connected with pico base stations 200. The controller 23 of each pico base station 200 recognizes the number $N_{pi}(\alpha)$ of mobile terminals 300 that have actually been connected with the pico base station 200. In other words, the controller 23 of each pico base station 200 serves as a counter for counting the number $N_{pi}(\alpha)$. The controller 23 of each pico base station 200 reports the number $N_{pi}(\alpha)$ to the controller 130 of the macro base station 100. The controller 130 serves as a number calculator for calculating the number $N_p(\alpha)$ in accordance with formula (10).

$$N_p(\alpha) = \sum_{i=1}^{N_{p/m}} N_{pi}(\alpha) \quad (10)$$

The number $N_p(0)$ is the number of mobile terminals 300 actually located at the centers of the pico cells Cp (mobile terminals 300 having been connected with the pico base station 200 without expansion of pico cell Cp by CRE). The controller 23 of the pico base station 200 can distinguish mobile terminals actually located at the centers of the pico cells Cp from mobile terminals actually located at the edges of the pico cells Cp by comparing the second reception power value R2 with a threshold. More specifically, mobile terminals actually located at the centers of the pico cells Cp are mobile terminals 300 of which the second reception power value R2 is higher than the threshold, whereas mobile terminals actually located at the edges of the pico cells Cp are mobile terminals 300 of which the second reception power value R2 is lower than the threshold. The controller 23 of each pico base station 200 serves as a mobile terminal classifier for distinguishing mobile terminals 300 of which the second reception power value R2 is higher than the threshold from mobile terminals 300 of which the second reception power value R2 is lower than the threshold by comparing the second reception power value R2 with the threshold. The controller 23 of each pico base station 200 serves as a counter for counting the number $N_{pi}(0)$ of mobile terminals actually located at the center of the pico cell Cp of the pico base station 200, and reports the number $N_{pi}(0)$ to the controller 130 of the macro base station 100. The controller 130 serves as a number calculator for calculating the number (0) in accordance with formula (11).

$$N_p(0) = \sum_{i=1}^{N_{p/m}} N_{pi}(0) \quad (11)$$

The first number ($N_p(\alpha)-N_p(0)$) can be calculated from the numbers $N_p(\alpha)$ and $N_p(0)$. Thus, the controller 130 serves as a number calculator for calculating the first number ($N_p(\alpha)-N_p(0)$).

However, the first number ($N_p(\alpha)-N_p(0)$) may be calculated as follows: The first number ($N_p(\alpha)-N_p(0)$) is the number of mobile terminals 300 actually located at the edges of the pico cells Cp (mobile terminals 300 that are assumed to be connected with the macro base station 100, rather than pico base stations 200 if CRE is not applied, but have been connected with pico base stations 200 by virtue of expansion of pico cells Cp by application of CRE). The controller 23 of the pico base station 200 can distinguish mobile terminals 300 located at the edge of the pico cell Cp from mobile terminals 300 located at the center of the pico cell Cp by comparing the second reception power value R2 with a threshold. More specifically, mobile terminals actually located at the centers of the pico cells Cp are mobile terminals 300 of which the second reception power value R2 is higher than the threshold, whereas mobile terminals actually located at the edges of the pico cells Cp are mobile terminals 300 of which the second reception power value R2 is lower than the threshold. The controller 23 of each pico base station 200 serves as a mobile terminal classifier for distinguishing mobile terminals 300 of which the second reception power value R2 is higher than the threshold from mobile terminals 300 of which the second reception power value R2 is lower than the threshold by comparing the second reception power value R2 with the threshold. The controller 23 of each pico base station 200 may serve as a counter for counting the number $N_{ppi}$ of mobile terminals actually located at the edge of the pico cell Cp of the pico base station 200, and may report the number $N_{ppi}$ to the controller 130 of the macro base station 100. The controller 130 may serve as a number calculator for calculating the first number $(N_p(\alpha)-N_p(0))$ in accordance with formula (12).

$$N_p(\alpha) - N_p(0) = \sum_{i=1}^{N_{p/m}} N_{ppi} \quad (12)$$

The first number $(N_p(\alpha)-N_p(0))$ and the second number $N_m(\alpha)$, which are parameters in formula (9), are thus calculated. Since the remaining parameters $N_{p/m}$ and $\beta$ are constants, the resource setter 134 can calculate the aforementioned provisional ratio r in accordance with formula (9).

In formula (9), the provisional ratio r may be a continuous value, but the actual ratio of protected subframes PSF is a discrete value (0/8, 1/8, 2/8, 3/8, . . . in the above example). Accordingly, the resource setter 134 calculates the ratio R (discrete value) of the number of protected subframes PSF to the sum of the number of non-protected subframes NSF and the number of protected subframes PSF, in accordance with formula (6) that uses the floor function. Alternatively, the resource setter 134 may calculate the ratio R (discrete value) of the number of protected subframes PSF to the sum of the number of non-protected subframes NSF and the number of protected subframes PSF, in accordance with formula (7) that uses the ceiling function. The resource setter 134 can thus calculate the ratio R (discrete value, 0/8, 1/8, 2/8, 3/8, . . . in the above example) of the number of protected subframes PSF to the sum of the number of non-protected subframes NSF and the number of protected subframes PSF, and sets the ABS pattern corresponding to the ratio R.

In view of formulae (2) to (5) and (8) to (12), formulae (9) is, in fact, equivalent to formulae (1). With reference to FIG. 9 again, the technical significance of formula (9) will be described. As will be apparent from FIG. 9, non-protected subframes NSF are periods during which the radio signal is sent from the macro base station 100. Protected subframes PSF are periods during which pico base stations 200 send radio signals destined mainly for mobile terminals 300 that are assumed to be connected with the macro base station 100, rather than pico base stations 200 if CRE is not applied, but have actually been connected with pico base stations 200 by virtue of application of CRE (mobile terminals actually located at the edges of the pico cells Cp). The ratio R that should be set by the access point selector 138 is the ratio of the number of protected subframes PSF to the sum of the number of non-protected subframes NSF and the number of protected subframes PSF.

As described above, the second number $N_m(\alpha)$ is the number of mobile terminals 300 that have actually been connected with the macro base station 100 when CRE is applied. The second number $N_m(\alpha)$ can be considered to correspond to non-protected subframes NSF. The first number $(N_p(\alpha)-N_p(0))$ is the number of mobile terminals actually located at the edges of the pico cells Cp (mobile terminals 300 that are assumed to be connected with the macro base station 100, rather than pico base stations 200 if CRE is not applied, but have been connected with pico base stations 200 by virtue of expansion of pico cells Cp by application of CRE). The first number $(N_p(\alpha)-N_p(0))$ can be considered to correspond to protected subframes PSF.

Therefore, it is preferable that the provisional ratio r be calculated in accordance with formula (13).

$$r = \frac{(N_p(\alpha) - N_p(0))}{N_m(\alpha) + (N_p(\alpha) - N_p(0))} \quad (13)$$

In other words, it is preferable that the modification coefficient $\beta$ in formula (9) be simply equal to $N_{p/m}$.

However, it is possible to determine a more appropriate modification coefficient $\beta$, depending on deployment of the pico base stations 200, radio wave propagation environment around respective pico base stations 200, and other factors. A preferable formula produced as a result of consideration of these factors is formula (9).

According to formula (9), it is possible to set the ratio R of the number of protected subframes PSF to the sum of the number of non-protected subframes NSF and the number of protected subframes PSF in such a manner that larger a proportion of the second number $N_m(\alpha)$ to the first number $(N_p(\alpha)-N_p(0))$, the smaller the ratio R. In summary, in a case in which there are few mobile terminals 300 located at edges of the cells of the pico base stations and utilize protected subframes PSF and there are many mobile terminals 300 utilizing the macro base station 100, it is possible to set the amount of the second resources (protected subframes PSF) unusable by the macro base station 100 to a low level and to set the amount of the first resources (non-protected subframes NSF) usable by the macro base station 100 to a high level. On the other hand, in a case in which there are many mobile terminals 300 located at edges of the cells of the pico base stations and utilize protected subframes PSF and there are few mobile terminals 300 utilizing the macro base station 100, it is possible to set the amount of the second resources (protected subframes PSF) unusable by the macro base station 100 to a high level and to set the amount of the first resources (non-protected subframes NSF) usable by the macro base station 100 to a low level. Accordingly, depending on the actual usage status of radio base stations 100 and 200, it is possible to suitably control the amount of resources usable at the macro base station 100. When viewed from the standpoint of mobile terminals 300, fairness of resource allocation for mobile terminals 300 connected to the macro base station 100 and mobile terminals 300 connected to pico base stations 200 is improved, and it is possible to avoid deterioration of throughput, irrespective of which radio base station with which the mobile terminal 300 is connected.

In this embodiment, the macro base station 100 sets an ABS pattern utilized in the macro cell Cm, on the basis of the number of mobile terminals 300 located in the entire macro cell Cm of the macro base station 100 and connected with the macro base station 100, and the number of mobile terminals 300 connected with the pico base stations 200 located in the entire macro cell Cm. However, the macro base station 100 may set an ABS pattern utilized in a sector in the macro cell Cm of the macro base station 100, on the basis of the number of mobile terminals 300 located in the sector and connected with the macro base station 100, and the number of mobile terminals 300 connected with the pico base stations 200 located in the sector. That is to say, the macro base station 100 may set an appropriate ABS pattern for respective sectors constituting the macro cell Cm.

Third Embodiment

Next, a third embodiment of the present invention will be described. The third embodiment is a variation of the first embodiment. In the third embodiment, structures of the macro base station 100, the pico base station 200, and the mobile terminal 300 may be the same as those in the first embodiment. Features that are the same as those in the first embodiment will not be described here in detail.

In addition to features of the first embodiment, in the third embodiment, the resource setter 134 of the macro base station 100 sets the ratio R of the number of protected subframes PSF to the sum of the number of non-protected subframes NSF and the number of protected subframes PSF, on the basis of the actual usage ratio of the resources at the high-power radio base station, in such a manner that the lower the usage ratio, the smaller the ratio R.

A specific example of setting the ratio will be described. The resource setter 134 of the macro base station 100 calculates a provisional ratio r of the number of protected subframes PSF to the sum of the number of non-protected subframes NSF and the number of protected subframes PSF in the macro base station 100, in accordance with formula (14).

$$r = \frac{\beta(P_p(\alpha) - P_p(0))/N_{p/m}}{P_m(\alpha) + \beta(P_p(\alpha) - P_p(0))/N_{p/m}} \cdot U_m \quad (14)$$

In formula (14), meanings of the parameters other than $U_m$ were described in conjunction with formula (1). The first proportion $(P_p(\alpha)-P_p(0))$ and the second proportion $P_m(\alpha)$ can be calculated in the manner described in conjunction with the first embodiment. It is preferable that the modification coefficient $\beta$ in formula (9) be simply equal to $N_{p/m}$. However, it is possible to determine a more appropriate modification coefficient $\beta$, depending on deployment of the pico base stations 200, radio wave propagation environment around respective pico base stations 200, and other factors.

The parameter $U_m$ is the actual usage ratio of resources at the macro base station 100. As described above, for the macro base station 100, non-protected subframes NSF are allocated for radio transmission to mobile terminals 300 connected to the macro base station 100. In the LTE, each subframe is divided into multiple resource elements (each identified by frequency and time), which are smaller transmission units. For radio transmission to mobile terminals 300 connected to the macro base station 100, the macro base station 100 executes scheduling, in which the resource elements are allocated to signals destined for each mobile terminal 300. The usage ratio $U_m$ is the ratio of the number of resource elements actually allocated to signals destined for each mobile terminal 300 at the macro base station 100 to the number of all resource elements that constitute non-protected subframes NSF.

The usage ratio $U_m$ may be the current instantaneous usage ratio, or an average value or a median value of usage ratios calculated previously. In either case, the controller 130 of the macro base station 100 serves as a usage ratio calculator for calculating the usage ratio $U_m$, which is the ratio of the number of resource elements actually allocated to signals destined for each mobile terminal 300 at the macro base station 100 to the number of all resource elements that constitute non-protected subframes NSF.

The resource setter 134 can calculate the provisional ratio r in accordance with formula (14). In formula (14), the provisional ratio r may be a continuous value, but the actual ratio of protected subframes PSF is a discrete value (0/8, 1/8, 2/8, 3/8, . . . in the above example). Accordingly, the resource setter 134 calculates the ratio R (discrete value) of the number of protected subframes PSF to the sum of the number of non-protected subframes NSF and the number of protected subframes PSF, in accordance with formula (6) that uses the floor function. Alternatively, the resource setter 134 may calculate the ratio R (discrete value) of the number of protected subframes PSF to the sum of the number of non-protected subframes NSF and the number of protected subframes PSF, in accordance with formula (7) that uses the ceiling function. The resource setter 134 can thus calculate the ratio R (discrete value, 0/8, 1/8, 2/8, 3/8, . . . in the above example) of the number of protected subframes PSF to the sum of the number of non-protected subframes NSF and the number of protected subframes PSF, and sets the ABS pattern corresponding to the ratio R.

Accordingly, it is possible to set the ratio R of the number of protected subframes PSF to the sum of the number of non-protected subframes NSF and the number of protected subframes PSF in such a manner that the lower the actual usage ratio $U_m$ of resources at the macro base station 100, the smaller the ratio R. The reason for multiplying the actual usage ratio $U_m$ of resources at the macro base station 100 in formula (14) is as follows:

In this embodiment, in a case in which the usage ratio $U_m$ of resources at the macro base station 100 is low, by intentionally decreasing the ratio R of the protected subframes PSF (increasing the ratio of the non-protected subframes NSF usable by the macro base station 100), the macro base station 100 can quickly send downlink traffic. After completion of transmission of downlink traffic from the macro base station 100, there is no interference with mobile terminals 300 connected to the pico base stations 200 caused by radio waves from the macro base station 100 not only at protected subframes PSF, but also at non-protected subframes NSF. That is, at each cycle of the ABS pattern (the cycle is 8 subframes in the above example), after completion of transmission of downlink traffic from the macro base station 100, non-protected subframes NSF are equivalent to protected subframes PSF for mobile terminals 300 connected to the pico base stations 200, and pico base stations 200 can utilize the non-protected subframes NSF for radio transmission to any of mobile terminals 300, regardless the distance from the pico base station 200 to the mobile terminals 300 (regardless the degree of the second reception power values R2 of the mobile terminals 300). As a result, at each cycle of the ABS pattern, after completion of transmission of downlink traffic from the macro base station 100, the pico base stations 200 can quickly send downlink traffic (it is possible to improve throughput of the pico base station 200).

Although the above-described third embodiment is a variation of the first embodiment, a similar concept may be applied to modify the second embodiment. That is to say, the resource setter 134 of the macro base station 100 may calculate a provisional ratio r of the number of protected subframes PSF to the sum of the number of non-protected subframes NSF and the number of protected subframes PSF in the macro base station 100, in accordance with formula (15).

$$r = \frac{\beta(N_p(\alpha) - N_p(0))/N_{p/m}}{N_m(\alpha) + \beta(N_p(\alpha) - N_p(0))/N_{p/m}} \cdot U_m \quad (15)$$

In formula (15), the meanings of the parameters other than $U_m$ were described in conjunction with formula (9). The first number $(N_p(\alpha)-N_p(0))$ and the second number $N_m(\alpha)$ can be calculated in the manner described in conjunction with the second embodiment. It is preferable that the modification coefficient β in formula (15) be simply equal to $N_{p/m}$. However, it is possible to determine a more appropriate modification coefficient β, depending on deployment of the pico base stations 200, radio wave propagation environment around respective pico base stations 200, and other factors.

In accordance with formula (6) that uses the floor function or formula (7) that uses the ceiling function, the resource setter 134 may calculate the ratio R (discrete value) of the number of protected subframes PSF to the sum of the number of non-protected subframes NSF and the number of protected subframes PSF. Thus, on the basis of the usage ratio $U_m$ of resources at the macro base station 100, the resource setter 134 of the macro base station 100 can set the ratio R of the number of protected subframes PSF to the sum of the number of non-protected subframes NSF and the number of protected subframes PSF, in such a manner that the smaller the usage ratio $U_m$, the smaller the ratio R.

Fourth Embodiment

In the first to third embodiments, the ratio R and the ABS pattern corresponding to the ratio R determined by the resource setter 134 of the macro base station 100 are used they are. In other words, the communication controller 136 of the macro base station 100 controls the radio communicator 110 on the basis of the resource allocation information AL corresponding to the ABS pattern. The controller 23 of the pico base station 200 located in the macro cell Cm of the macro base station 100 executes the downlink resource allocation for mobile terminals 300 connected to the pico base station 200, i.e., scheduling in accordance with, for example, a proportional fairness algorithm to control the radio communicator 210. The controller 23 of the pico base station 200 may control the radio communicator 210 on the basis of the resource allocation information AL.

However, as in the various embodiments described below, the macro base station 100 may modify the ratio R determined temporarily at the macro base station 100 on the basis of ratios R temporarily determined in the past at other macro base stations 100 neighboring the macro base station 100, and may use the ABS pattern corresponding to the modified ratio AR.

A fourth embodiment of the present invention will be described. In the fourth and subsequent embodiments, structures of the macro base station 100, the pico base station 200, and the mobile terminal 300 may be the same as those in the first embodiment. Features that are the same as those in the first embodiment will not be described here in detail. The resource setter 134 of the macro base station 100 temporarily determines the ratio R of the number of protected subframes PSF to the sum of the number of non-protected subframes NSF and the number of protected subframes PSF in accordance with one of the manners described in conjunction with the first to third embodiments, and then temporarily determines the ABS pattern corresponding to ratio R.

Figure 10:
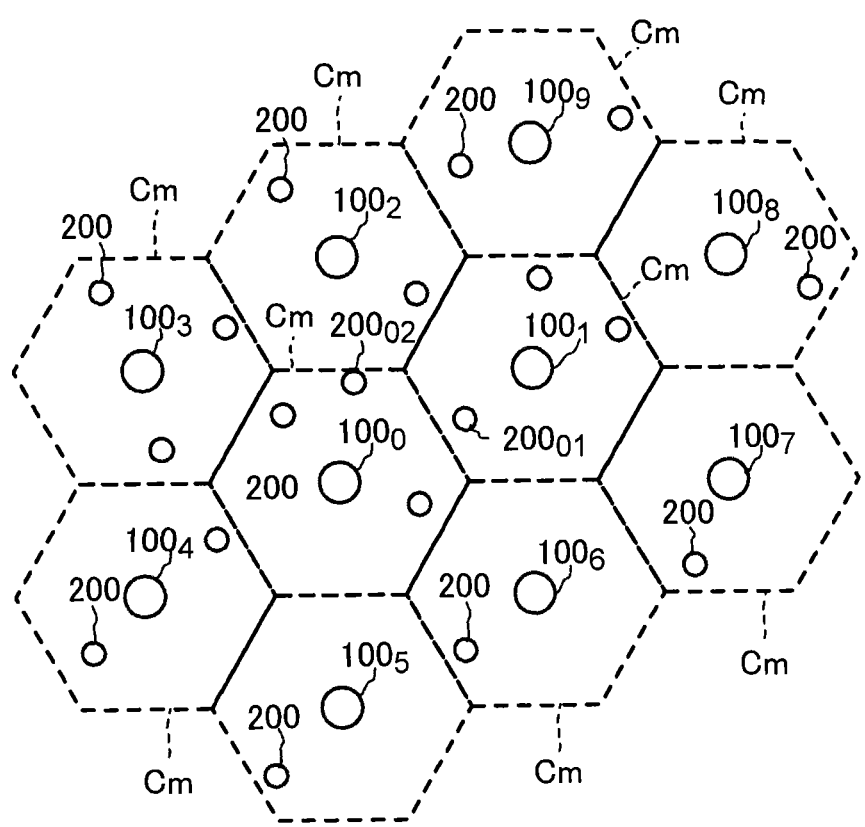
FIG. 10 is a schematic view showing an example of deployment of multiple macro base stations, multiple pico base stations, and multiple macro cells in a radio communication system according to the present invention.

FIG. 10 is a schematic view showing an example of deployment of multiple macro base stations 100, multiple pico base stations 200, and multiple macro cells Cm. At least one pico base station 200 is deployed in each macro cell Cm defined by a macro base station 100. FIG. 10 shows that multiple macro cells Cm do not overlap, but of course, the macro cells Cm may overlap one on the other.

In the fourth and subsequent embodiments, each of some pico base stations 200 is a common pico base station (common low-power radio base station) configured to communicate with two neighboring macro base stations 100, and each of multiple macro base stations 100 (in FIG. 10, macro base stations $100_0$ to $100_8$) is configured to communicate with multiple common pico base stations 200. For example, in FIG. 10, the pico base station $200_{01}$ is the common pico base station for two neighboring macro base stations $100_0$ and $100_1$, whereas the pico base station $200_{02}$ is the common pico base station for two neighboring macro base stations $100_0$ and $100_2$.

The resource setter 134 of each macro base station 100 temporarily determines the ratio R and the ABS pattern at each predetermined control cycle. Each common pico base station 200 selects the minimum value among the ratios R temporarily determined by two neighboring macro base stations 100 (that will be called the first macro base station 100 and the second macro base station 100 for convenience) that share the pico base station 200, and reports the selected minimum value to the first macro base station 100 and the second macro base station 100. Each macro base station 100 receives the multiple minimum values from respective common pico base stations 200 located around the macro base station 100. For example, in FIG. 10, the macro base station $100_0$ receives the minimum values, not only from the pico base stations $200_{01}$ and $200_{02}$, but also from the common pico base station of the macro base stations $100_0$ and $100_3$, the common pico base station of the macro base stations $100_0$ and $100_4$, the common pico base station of the macro base stations $100_0$ and $100_5$, and the common pico base station of the macro base stations $100_0$ and $100_6$. The macro base station $100_1$ receives the minimum values, not only from the pico base station $200_{01}$, but also from common pico base station of the macro base stations $100_1$ and $100_6$, the common pico base station of the macro base stations $100_1$ and $100_7$, the common pico base station of the macro base stations $100_1$ and $100_8$, the common pico base station of the macro base stations $100_1$ and $100_9$, and the common pico base station of the macro base stations $100_1$ and $100_2$.

The resource setter 134 of each macro base station 100 adopts the minimum value chosen between the ratio R that is currently determined by the resource setter 134 and the multiple minimum values at the last control cycle received from pico base stations 200, as a modified ratio with which the communication controller 136 of the macro base station 100 should comply.

Figure 11:
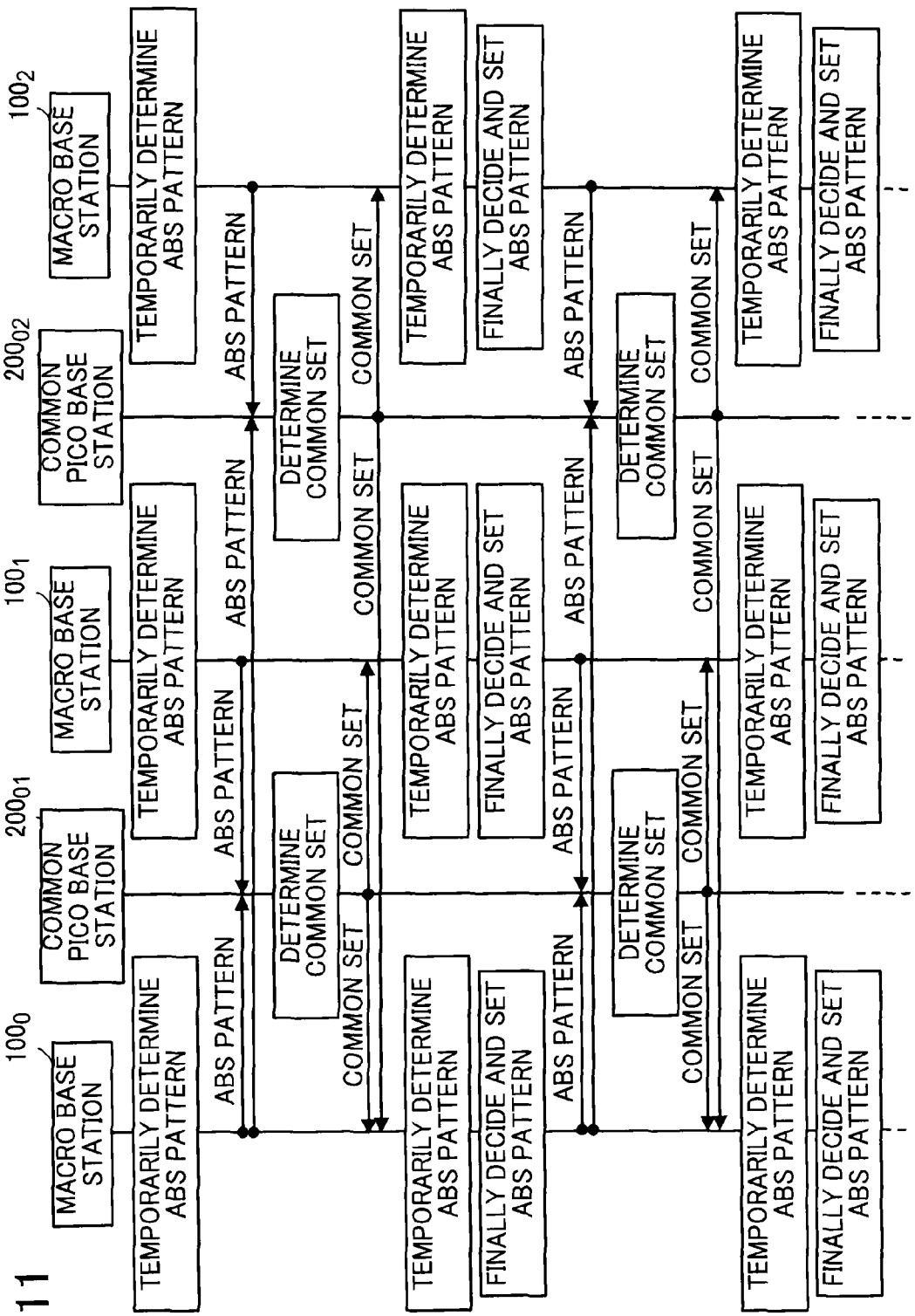
FIG. 11 is an information flow diagram showing an operation in a radio communication system of a fourth embodiment of the present invention.

FIG. 11 shows an operation in the radio communication system of the fourth embodiment. For convenience of explanation, FIG. 11 shows only the macro base stations $100_0$ to $100_2$ and the pico base stations $200_{01}$ and $200_{02}$. However, other macro base stations and other common pico base stations operate in a similar manner. As shown in FIG. 11, the resource setter 134 of each macro base station 100 temporarily determines the ratio R and the ABS pattern. The resource setter 134 reports the determined ABS pattern via the inter-base station communicator 120 to the common pico base stations. Since the ABS pattern corresponds to the ratio R, the signal indicating the ABS pattern sent from the macro base station 100 is a signal indicating the ratio R.

Figure 12:
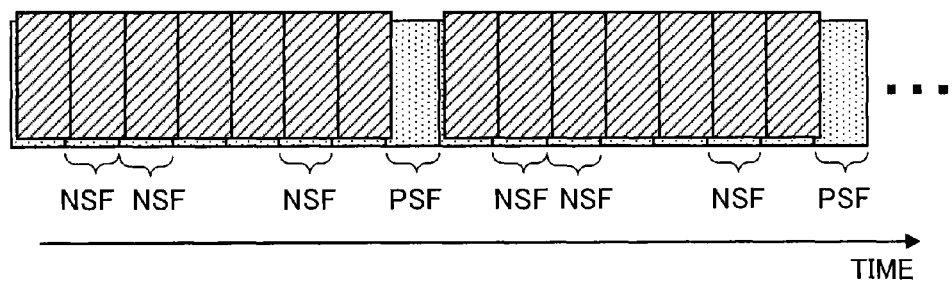
FIG. 12 is a view showing an ABS pattern in a case in which a ratio R is 1/8.
Figure 13:
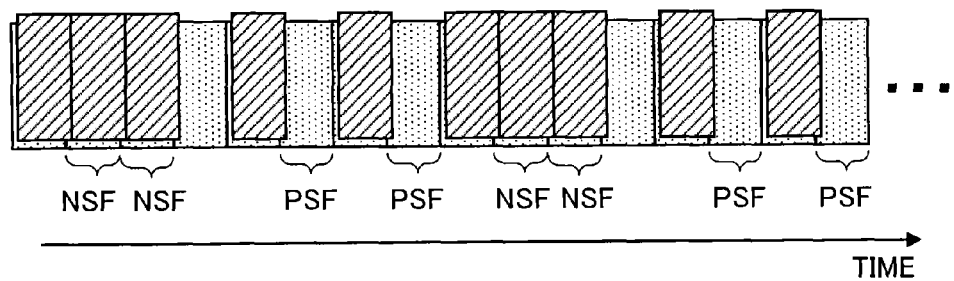
FIG. 13 is a view showing an ABS pattern in a case in which a ratio R is 3/8.

Upon receiving two ABS pattern reports of the ABS pattern at the inter-base station communicator 220 from the two neighboring macro base stations 100, respectively, the controller (minimum value selector) 230 of each common pico base station 200 determines a common set from the two ABS patterns. FIG. 12 shows the ABS pattern in a case in which the ratio R is 1/8, whereas FIG. 13 shows the ABS pattern in a case in which the ratio R is 3/8. Protected subframes PSF for an ABS pattern for a higher ratio R of protected subframes PSF must include protected subframes PSF for an ABS pattern for a lower ratio R of protected subframes PSF. In summary, protected subframes PSF for an ABS pattern with the ratio R being n/8 must include protected subframes PSF for an ABS pattern with the ratio R being (n−1)/8. For example, the protected subframes PSF for the ABS pattern with ratio 3/8 (FIG. 13) include the protected subframes PSF in the eight subframe-unit occurring in the ABS pattern with ratio 1/8 (FIG. 12).

The common set is an ABS pattern in which protected subframes PSF are common to the two ABS patterns. In other words, the common set is an ABS pattern of which the corresponding ratio R is the minimum chosen between the two ABS patterns. For example, the common set of the ABS pattern with the ratio R being 1/8 (FIG. 12) and the ABS pattern with the ratio R being 3/8 (FIG. 13) is the ABS pattern with the ratio R being 1/8. Therefore, determination or selection of the common set at the controller (minimum value selector) 230 of each common pico base station 200 is equivalent to selection of the minimum value of the ratios determined temporarily at the resource setters 134 of the two macro base stations 100 related to the common pico base station.

Returning to FIG. 11, upon selecting the common set at the controller 230, the controller (minimum value reporter) 230 of the common pico base station 200 reports the common set (and thus, the minimum value) via the inter-base station communicator 220 to the macro base stations 100 related to the pico base station 200. The inter-base station communicator (minimum value receiver) 120 of each macro base station 100 receives multiple common sets (and thus, the minimum values) from the respective common pico base stations 200 to which the macro base station 100 is related.

At the next control time, the resource setter 134 of each macro base station 100 temporarily determines the ratio R and the ABS pattern. Then, the resource setter 134 of the macro base station 100 finally decides the ABS pattern on the basis of the currently determined ratio R and the multiple common sets (and thus, the minimum values) received at the inter-base station communicator 120.

At the final decision of the ABS pattern according to the fourth embodiment, the resource setter 134 selects the common set of the ABS pattern currently determined at the resource setter 134 and the multiple common sets received at the inter-base station communicator 120 (that are common sets at the last control cycle for the ABS pattern currently determined). This selection is equivalent to selection of the minimum value chosen from between the ratio R(t) that is currently determined by the resource setter 134 and the multiple minimum values R(t−1) at the last control cycle received at the inter-base station communicator 120. Then, the resource setter 134 adopts (i.e., sets) the minimum value (the common set selected by the resource setter 134, i.e., the ratio R corresponding to the ABS pattern) as the modified ratio AR with which the communication controller 136 of the macro base station 100 should comply.

On the basis of resource allocation information AL corresponding to the ABS pattern corresponding to the modified ratio AR, the communication controller 136 of the macro base station 100 controls the radio communicator 110. The controller 230 of the pico base station 200 located in the macro cell Cm of the macro base station 100 executes downlink resource allocation for mobile terminals 300 connected with the pico base station 200, i.e., scheduling, for example, in accordance with a proportional fairness algorithm, and controls the radio communicator 210. The controller 230 of the pico base station 200 may control the radio communicator 210 on the basis of the resource allocation information AL. On the other hand, the resource setter 134 reports the current ABS pattern (current ratio R) determined temporarily via the inter-base station communicator 120 to the common pico base stations. Afterward, the same operation is repeated.

Figure 14:
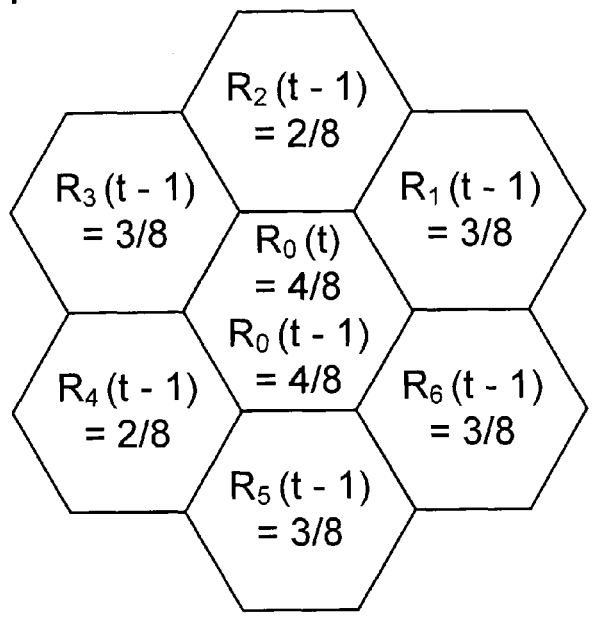
FIG. 14 is a view for describing an example of a modified ratio AR finally set in the fourth embodiment of the present invention.

With reference to FIG. 14, an example of the modified ratio AR finally set at the macro base station $100_0$ (see FIG. 10) according to this embodiment will be described. Let us assume that the ratio $R_0(t-1)$ temporally determined by the macro base station $100_0$ at the last control cycle is 4/8. Similarly, let us assume that the ratio $R_1(t-1)$ temporally determined by the macro base station $100_1$ at the last control cycle is 3/8, the ratios $R_2(t-1)$ temporally determined by the macro base station $100_2$ at the last control cycle is 2/8. Also, the ratio $R_3(t-1)$ is assumed to be 3/8, the ratio $R_4(t-1)$ is assumed to be 2/8, the ratio $R_5(t-1)$ is assumed to be 3/8, and the ratio $R_6(t-1)$ is assumed to be 3/8.

Information indicating multiple common sets is transmitted to the macro base station $100_0$ from multiple common pico base stations 200 related to the macro base station $100_0$. Those common sets are 2/8, 3/8, 2/8, 3/8, 3/8, and 3/8. The minimum ratio R(t−1) among the common sets is 2/8. Let us assume that the resource setter 134 of the macro base station $100_0$ temporarily determines the current ratio $R_0(t)$ as 4/8. Since the resource setter 134 of the macro base station $100_0$ selects the minimum value chosen between the current ratio $R_0(t)$ and the ratios indicated by the multiple common sets, the resource setter 134 finally decides the modified ratio AR as 2/8.

As described above, in the fourth embodiment, each macro base station 100 adopts (i.e., sets) the minimum value chosen between the ratios corresponding to the common sets that are based on the ratios R(t−1) temporally determined by other neighboring macro base stations 100 at the last control cycle and the ratio R(t) currently determined by the macro base station 100 as the modified ratio AR with which the communication controller 136 of the macro base station 100 should comply.

In contrast, according to the first to third embodiments, the ratio R determined by the resource setter 134 of the macro base station 100 is adopted as a ratio with which the communication controller 136 of the macro base station 100 should comply. In this case, part of protected subframes PSF in a macro cell Cm in which a greater ratio R is used do not accord with protected subframes PSF in another macro cell Cm in which a smaller ratio R is used (the subframes are non-protected subframes NSF at which the macro base station 100 executes radio transmission). Therefore, in a case in which multiple neighboring macro base stations 100 use different ratios R (different ABS patterns), mobile terminals 300 communicating with pico base stations 200 within the macro cell Cm in which a greater ratio R is used are likely to be subject to interference caused by signals transmitted from the neighboring macro base station in the macro cell Cm although such mobile terminals 300 receive signals at protected subframes PSF in the macro cell Cm. In particular, when the difference of ratios R of multiple neighboring macro base stations 100 is great, this is a serious concern.

According to the fourth embodiment, it is possible to minimize the difference in ratios (modified ratios AR) used in neighboring macro base stations 100, and to reduce or prevent the aforementioned problem of interference caused by other macro base stations 100.

Fifth Embodiment

In the fourth embodiment, by means of mediation by the common pico base stations 200, each macro base station 100 adopts (i.e., sets) the minimum value chosen between the ratios corresponding to the common sets that are based on the ratios R(t−1) temporally determined by other neighboring macro base stations 100 at the last control cycle and the ratio R(t) currently determined by the macro base station 100 as the modified ratio AR with which the communication controller 136 of the macro base station 100 should comply.

However, without using mediation by the common pico base stations 200, by means of mutual communication among the macro base station 100, each macro base station 100 may adopt (i.e., set) the minimum value chosen between the ratios corresponding to the common sets that are based on the ratios R(t−1) temporally determined by other neighboring macro base stations 100 at the last control cycle and the ratio R(t) currently determined by the macro base station 100 as the modified ratio AR with which the communication controller 136 of the macro base station 100 should comply. A fifth embodiment in which such operations are executed will be described.

In the fifth embodiment again, the resource setter 134 of the macro base station 100 determines the ratio R of the number of protected subframes PSF to the sum of the number of non-protected subframes NSF and the number of protected subframes PSF in accordance with one of the manners described in conjunction with the first to third embodiments, and then the ABS pattern corresponding to ratio R. The resource setter 134 of each of the macro base stations 100 selects the minimum value chosen between the ratio R(t) that is currently determined by the resource setter 134 and the ratios R(t−1) determined in the past at the resource setters 134 of the neighboring macro base stations 100 located near the macro base station 100 with which this resource setter 134 is provided, and adopts the selected minimum value, as the modified ratio AR with which the communication controller 136 of the macro base station 100 should comply.

Figure 15:
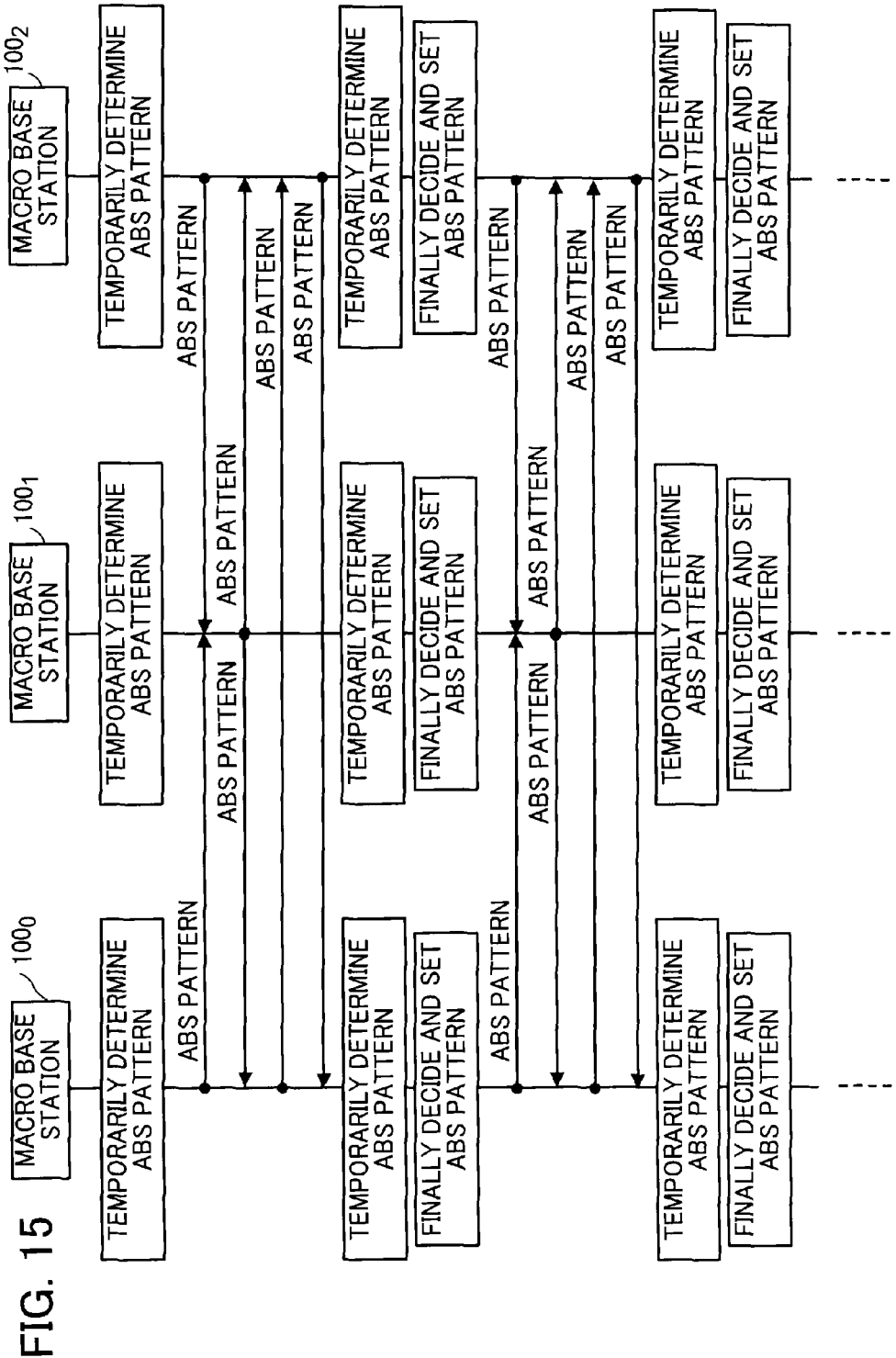
FIG. 15 is an information flow diagram showing an operation in a radio communication system of a fifth embodiment of the present invention.

FIG. 15 shows an operation in the radio communication system of the fifth embodiment. For convenience of explanation, FIG. 15 shows only the macro base stations $100_0$ to $100_2$. However, other macro base stations operate in a similar manner. As shown in FIG. 15, the resource setter 134 of each macro base station 100 temporarily determines the ratio R and the ABS pattern. The resource setter 134 reports the determined ABS pattern via the inter-base station communicator 120 to neighboring macro base stations. Since the ABS pattern corresponds to the ratio R, the signal indicating the ABS pattern sent from the macro base station 100 is a signal indicating the ratio R.

At the next control time, the resource setter 134 of each macro base station 100 temporarily determines the ratio R and the ABS pattern. Then, the resource setter 134 of the macro base station 100 finally decides the ABS pattern on the basis of the currently determined ratio R(t) and multiple ABS patterns (and thus, the ratios R(t−1)) from multiple neighboring macro base stations received at the inter-base station communicator 120.

At the final decision of the ABS pattern according to the fifth embodiment, the resource setter 134 selects the common set of the ABS pattern currently determined at the resource setter 134 and the multiple ABS patterns received at the inter-base station communicator 120 (that are ABS patterns at the last control cycle for the ABS pattern currently determined). This selection is equivalent to selection of the minimum value chosen between the ratio R(t) that is currently determined by the resource setter 134 and the multiple ratios R(t−1) at the last control cycle received at the inter-base station communicator 120. Then, the resource setter 134 adopts (i.e., sets) the minimum value (the common set selected by the resource setter 134, i.e., the ratio R corresponding to the ABS pattern) as the modified ratio AR with which the communication controller 136 of the macro base station 100 should comply.

On the basis of resource allocation information AL corresponding to the ABS pattern corresponding to the modified ratio AR, the communication controller 136 of the macro base station 100 controls the radio communicator 110. The controller 230 of the pico base station 200 located in the macro cell Cm of the macro base station 100 executes downlink resource allocation for mobile terminals 300 connected with the pico base station 200, i.e., scheduling, for example, in accordance with a proportional fairness algorithm, and controls the radio communicator 210. The controller 230 of the pico base station 200 may control the radio communicator 210 on the basis of the resource allocation information AL. On the other hand, the resource setter 134 reports the current ABS pattern (current ratio R) determined temporarily via the inter-base station communicator 120 to the neighboring macro base stations. Afterward, the same operation is repeated.

In this embodiment again, for example, in the aforementioned situation described with reference to FIG. 14, since the resource setter 134 of the macro base station $100_0$ selects the minimum value chosen between the current ratio $R_0(t)$ and the multiple ratios $R_1(t-1)$ to $R_6(t-1)$, the resource setter 134 finally decides that the modified ratio AR should be 2/8.

As described above, in the fifth embodiment, each macro base station 100 adopts (i.e., sets) the minimum value chosen between the ratios R(t−1) temporally determined by other neighboring macro base stations 100 at the last control cycle and the ratio R(t) currently determined by the macro base station 100 as the modified ratio AR with which the communication controller 136 of the macro base station 100 should comply. Therefore, it is possible to minimize the difference in ratios (modified ratios AR) used in neighboring macro base stations 100, and to reduce or prevent the aforementioned problem of interference caused by other macro base stations 100. In this embodiment, pico base stations 200 do not need to operate as common pico base stations.

Sixth Embodiment

In the fourth embodiment, the resource setter 134 of each macro base station 100 adopts the minimum value chosen between the ratio R that is currently determined by the resource setter 134 of the macro base station 100 and the multiple minimum values at the last cycle received at the inter-base station communicator (minimum value receiver) 120, as a modified ratio AR with which the communication controller 136 of the macro base station 100 should comply.

However, the resource setter 134 of each macro base station 100 may adopt an average value or a median value of the ratio R that is currently determined by the resource setter 134 of the macro base station 100 and the multiple minimum values at the last cycle received at the inter-base station communicator (minimum value receiver) 120, as a modified ratio AR with which the communication controller 136 of the macro base station 100 should comply. A sixth embodiment in which such operations are executed will be described.

In the sixth embodiment, operations of the common pico base stations are the same as those in the fourth embodiment. In the sixth embodiment again, the information flow diagram in the radio communication system is the same as that shown in FIG. 11.

However, at the final decision of the ABS pattern according to the sixth embodiment, the resource setter 134 calculates the average value or the median value of the ratio R corresponding to the ABS pattern currently determined at the resource setter 134 and the ratios R corresponding to the multiple common sets received at the inter-base station communicator 120 (that are common sets at the last control cycle for the ABS pattern currently determined). This calculation is calculation of the average value or the median value of the ratio R(t) that is currently determined by the resource setter 134 and the multiple ratios R(t−1) at the last control cycle received at the inter-base station communicator 120. Then, the resource setter 134 adopts (i.e., sets) the average value or the median value as the modified ratio AR with which the communication controller 136 of the macro base station 100 should comply.

On the basis of resource allocation information AL corresponding to the ABS pattern corresponding to the modified ratio AR, the communication controller 136 of the macro base station 100 controls the radio communicator 110. The controller 230 of the pico base station 200 located in the macro cell Cm of the macro base station 100 executes downlink resource allocation for mobile terminals 300 connected with the pico base station 200, i.e., scheduling, for example, in accordance with a proportional fairness algorithm, and controls the radio communicator 210. The controller 230 of the pico base station 200 may control the radio communicator 210 on the basis of the resource allocation information AL. On the other hand, the resource setter 134 reports the current ABS pattern (current ratio R) determined temporarily via the inter-base station communicator 120 to the common pico base stations. Afterward, the same operation is repeated.

With reference to FIG. 14 again, an example of the modified ratio AR finally set at the macro base station $100_0$ (see FIG. 10) according to this embodiment will be described. Information indicating multiple common sets is transmitted to the macro base station $100_0$ from multiple common pico base stations 200 related to the macro base station $100_0$. Those common sets are 2/8, 3/8, 2/8, 3/8, 3/8, and 3/8. Let us assume that the resource setter 134 of the macro base station $100_0$ temporarily determines the current ratio $R_0(t)$ as 4/8. The resource setter 134 of the macro base station $100_0$ may calculate the average value of the current ratio $R_0(t)$ and ratios indicated by the multiple common sets. The average value is 2.857/8. The resource setter 134 may convert this with the floor function, and may finally decide the modified ratio AR as being 2/8. Alternatively, the resource setter 134 may convert this with the ceiling function, and may finally decide the modified ratio AR as 3/8.

The resource setter 134 of the macro base station 100 may calculate the median value of the current ratio $R_0(t)$ and ratios indicated by the multiple common sets. The median value is 3/8. The resource setter 134 may finally decide the modified ratio AR as being 3/8.

As described above, in the sixth embodiment, each macro base station 100 adopts (i.e., sets) the average value or the median value of the ratios corresponding to the common sets based on the ratios R(t−1) temporarily determined by other neighboring macro base stations 100 at the last control cycle and the ratio R(t) currently determined by the macro base station 100 as the modified ratio AR with which the communication controller 136 of the macro base station 100 should comply. Therefore, it is possible to minimize the difference in ratios (modified ratios AR) used in neighboring macro base stations 100, and to reduce or prevent the aforementioned problem of interference caused by other macro base stations 100.

Seventh Embodiment

In the sixth embodiment, by means of mediation by the common pico base stations 200, each macro base station 100 adopts (i.e., sets) the average value or the median value of the ratios corresponding to the common sets that are based on the ratios R(t−1) temporally determined by other neighboring macro base stations 100 at the last control cycle and the ratio R(t) currently determined by the macro base station 100 as the modified ratio AR with which the communication controller 136 of the macro base station 100 should comply.

However, without using mediation by the common pico base stations 200, by means of mutual communication among the macro base stations 100, each macro base station 100 may adopt (i.e., set) the average value or the median value of the ratios corresponding to the common sets that are based on the ratios R(t−1) temporally determined by other neighboring macro base stations 100 at the last control cycle and the ratio R(t) currently determined by the macro base station 100 as the modified ratio AR with which the communication controller 136 of the macro base station 100 should comply. A seventh embodiment in which such operations are executed will be described.

In the seventh embodiment, again, the resource setter 134 of the macro base station 100 determines the ratio R of the number of protected subframes PSF to the sum of the number of non-protected subframes NSF and the number of protected subframes PSF in accordance with one of the ways described in conjunction with the first to third embodiments, and then the ABS pattern corresponding to ratio R. The resource setter 134 of each of the macro base stations 100 calculates the average value or the median value of the ratio R(t) that is currently determined by the resource setter 134 and the ratios R(t−1) determined in the past at the resource setters 134 of the neighboring macro base stations 100 located near the macro base station 100 with which this resource setter 134 is provided, and adopts the calculated average value or the median value, as the modified ratio AR with which the communication controller 136 of the macro base station 100 should comply.

In the seventh embodiment again, the information flow diagram in the radio communication system is the same as that shown in FIG. 15.

However, at the final decision of the ABS pattern according to the seventh embodiment, the resource setter 134 calculates the average value or the median value of the ratio R corresponding to the ABS pattern currently determined at the resource setter 134 and the ratios R corresponding to the multiple ABS patterns received at the inter-base station communicator 120 (that are common sets at the last control cycle for the ABS pattern currently determined). This calculation is calculation of the average value or the median value of the ratio R(t) that is currently determined by the resource setter 134 and the multiple ratios R(t−1) at the last control cycle received at the inter-base station communicator 120. Then, the resource setter 134 adopts (i.e., sets) the average value or the median value as the modified ratio AR with which the communication controller 136 of the macro base station 100 should comply.

On the basis of resource allocation information AL corresponding to the ABS pattern corresponding to the modified ratio AR, the communication controller 136 of the macro base station 100 controls the radio communicator 110. The controller 230 of the pico base station 200 located in the macro cell Cm of the macro base station 100 executes downlink resource allocation for mobile terminals 300 connected with the pico base station 200, i.e., scheduling, for example, in accordance with a proportional fairness algorithm, and controls the radio communicator 210. The controller 230 of the pico base station 200 may control the radio communicator 210 on the basis of the resource allocation information AL.

On the other hand, the resource setter 134 reports the current ABS pattern (current ratio R) determined temporarily via the inter-base station communicator 120 to the neighboring macro base stations. Afterward, the same operation is repeated.

In this embodiment again, for example, in the aforementioned situation described with reference to FIG. 14, since the resource setter 134 of the macro base station $100_0$ calculates the average value or the median value of the current ratio $R_0(t)$ and the multiple ratios $R_1(t-1)$ to $R_6(t-1)$, the resource setter 134 finally decides the modified ratio AR as being 2/8 or 3/8.

As described above, in the seventh embodiment, each macro base station 100 adopts (i.e., sets) the average value or the median value of the ratios R(t-1) temporally determined by other neighboring macro base stations 100 at the last control cycle and the ratio R(t) currently determined by the macro base station 100 as the modified ratio AR with which the communication controller 136 of the macro base station 100 should comply. Therefore, it is possible to minimize the difference in ratios (modified ratios AR) used in neighboring macro base stations 100, and to reduce or prevent the aforementioned problem of interference caused by other macro base stations 100. In this embodiment, pico base stations 200 do not need to operate as common pico base stations.

Eighth Embodiment

In the fourth embodiment, the resource setter 134 of each macro base station 100 adopts the minimum value chosen between the ratio R that is currently determined by the resource setter 134 of the macro base station 100 and the multiple minimum values at the last cycle received at the inter-base station communicator (minimum value receiver) 120, as a modified ratio AR with which the communication controller 136 of the macro base station 100 should comply.

However, the resource setter 134 of each macro base station 100 may adopt a value within a predetermined range from the minimum value chosen between the ratio R that is currently determined by the resource setter 134 of the macro base station 100 and the multiple minimum values at the last cycle received at the inter-base station communicator (minimum value receiver) 120, as a modified ratio AR with which the communication controller 136 of the macro base station 100 should comply. An eighth embodiment in which such operations are executed will be described.

In the eighth embodiment, operations of the common pico base stations are the same as those in the fourth embodiment. In the eighth embodiment again, the information flow diagram in the radio communication system is the same as that shown in FIG. 11.

However, at the final decision of the ABS pattern according to the eighth embodiment, the resource setter 134 selects the minimum value of the ratio corresponding to the ABS pattern currently determined at the resource setter 134 and the ratios R corresponding to the multiple common sets received at the inter-base station communicator 120 (that are common sets at the last control cycle for the ABS pattern currently determined). This selection is equivalent to selection of the minimum value between the ratio R(t) that is currently determined by the resource setter 134 and the multiple minimum values R(t-1) at the last control cycle received at the inter-base station communicator 120. Then, the resource setter 134 adopts (i.e., sets) a value within a predetermined range from the minimum value (the common set selected by the resource setter 134, i.e., the ratio R corresponding to the ABS pattern) as the modified ratio AR with which the communication controller 136 of the macro base station 100 should comply.

On the basis of resource allocation information AL corresponding to the ABS pattern corresponding to the modified ratio AR, the communication controller 136 of the macro base station 100 controls the radio communicator 110. The controller 230 of the pico base station 200 located in the macro cell Cm of the macro base station 100 executes downlink resource allocation for mobile terminals 300 connected with the pico base station 200, i.e., scheduling, for example, in accordance with a proportional fairness algorithm, and controls the radio communicator 210. The controller 230 of the pico base station 200 may control the radio communicator 210 on the basis of the resource allocation information AL. On the other hand, the resource setter 134 reports the current ABS pattern (current ratio R) determined temporarily via the inter-base station communicator 120 to the common pico base stations. Afterward, the same operation is repeated.

With reference to FIG. 14 again, an example of the modified ratio AR finally set at the macro base station $100_0$ (see FIG. 10) according to this embodiment will be described. Information indicating multiple common sets is transmitted to the macro base station $100_0$ from multiple common pico base stations 200 related to the macro base station $100_0$. Those common sets are 2/8, 3/8, 2/8, 3/8, 3/8, and 3/8. Let us assume that the resource setter 134 of the macro base station $100_0$ temporarily determines the current ratio $R_0(t)$ as 4/8. The resource setter 134 of the macro base station $100_0$ selects 2/8 that is the minimum value chosen between the current ratio $R_0(t)$ and the ratios indicated by the multiple common sets. Then, the resource setter 134 adopts (i.e., sets) a value within a predetermined range from the minimum value, as the modified ratio AR with which the communication controller 136 of the macro base station 100 should comply. For example, in a case in which the predetermined range is 1/8, the resource setter 134 sets 3/8 as the modified ratio AR. For example, in a case in which the predetermined range is 2/8, the resource setter 134 sets 4/8 as the modified ratio AR.

As described above, in the eighth embodiment, each macro base station 100 adopts (i.e., sets) a value within a predetermined range from the minimum value chosen between the ratios corresponding to the common sets that are based on the ratios R(t-1) temporally determined by other neighboring macro base stations 100 at the last control cycle and the ratio R(t) currently determined by the macro base station 100 as the modified ratio AR with which the communication controller 136 of the macro base station 100 should comply. Therefore, it is possible to minimize the difference in ratios (modified ratios AR) used in neighboring macro base stations 100, and to reduce or prevent the aforementioned problem of interference caused by other macro base stations 100.

Ninth Embodiment

In the eighth embodiment, by means of mediation by the common pico base stations 200, each macro base station 100 adopts (i.e., sets) a value within a predetermined range from the minimum value chosen between the ratios corresponding to the common sets that are based on the ratios R(t-1) temporally determined by other neighboring macro base stations 100 at the last control cycle and the ratio R(t) currently determined by the macro base station 100 as the modified ratio AR with which the communication controller 136 of the macro base station 100 should comply.

However, without using mediation by the common pico base stations 200, by means of mutual communication among the macro base station 100, each macro base station 100 may adopt (i.e., set) a value within a predetermined range from the minimum value chosen between the ratios corresponding to the common sets that are based on the ratios R(t−1) temporally determined by other neighboring macro base stations 100 at the last control cycle and the ratio R(t) currently determined by the macro base station 100 as the modified ratio AR with which the communication controller 136 of the macro base station 100 should comply. A ninth embodiment in which such operations are executed will be described.

In the ninth embodiment again, the resource setter 134 of the macro base station 100 determines the ratio R of the number of protected subframes PSF to the sum of the number of non-protected subframes NSF and the number of protected subframes PSF in accordance with one of the manners described in conjunction with the first to third embodiments, and then the ABS pattern corresponding to ratio R. The resource setter 134 of each of the macro base stations 100 selects the minimum value chosen between the ratio R(t) that is currently determined by the resource setter 134 and the ratios R(t−1) determined in the past at the resource setters 134 of the neighboring macro base stations 100 located near the macro base station 100 with which this resource setter 134 is provided, and adopts a value within a predetermined range from the selected minimum value, as the modified ratio AR with which the communication controller 136 of the macro base station 100 should comply.

In the ninth embodiment, the information flow diagram in the radio communication system is the same as that shown in FIG. 15.

However, at the final decision of the ABS pattern according to the ninth embodiment, the resource setter 134 selects the common set of the ABS pattern currently determined at the resource setter 134 and the multiple ABS patterns received at the inter-base station communicator 120 (that are ABS patterns at the last control cycle for the ABS pattern currently determined). This selection is equivalent to selection of the minimum value between the ratio R(t) that is currently determined by the resource setter 134 and the multiple ratios R(t−1) at the last control cycle received at the inter-base station communicator 120. Then, the resource setter 134 adopts (i.e., sets) a value within a predetermined range from the minimum value (the common set selected by the resource setter 134, i.e., the ratio R corresponding to the ABS pattern) as the modified ratio AR with which the communication controller 136 of the macro base station 100 should comply.

On the basis of resource allocation information AL corresponding to the ABS pattern corresponding to the modified ratio AR, the communication controller 136 of the macro base station 100 controls the radio communicator 110. The controller 230 of the pico base station 200 located in the macro cell Cm of the macro base station 100 executes downlink resource allocation for mobile terminals 300 connected with the pico base station 200, i.e., scheduling, for example, in accordance with a proportional fairness algorithm, and controls the radio communicator 210. The controller 230 of the pico base station 200 may control the radio communicator 210 on the basis of the resource allocation information AL. On the other hand, the resource setter 134 reports the current ABS pattern (current ratio R) determined temporarily via the inter-base station communicator 120 to the neighboring macro base stations. Afterward, the same operation is repeated.

In this embodiment again, for example, in the aforementioned situation described with reference to FIG. 14, since the resource setter 134 of the macro base station $100_0$ selects the minimum value 2/8 among the current ratio $R_0(t)$ and the multiple ratios $R_1(t-1)$ to $R_6(t-1)$, the resource setter 134 finally decides the modified ratio AR as 3/8 or 4/8 within a predetermined range from the minimum value 2/8.

As described above, in the ninth embodiment, each macro base station 100 adopts (i.e., sets) a value within a predetermined range from the minimum value chosen between the ratios R(t−1) temporally determined by other neighboring macro base stations 100 at the last control cycle and the ratio R(t) currently determined by the macro base station 100 as the modified ratio AR with which the communication controller 136 of the macro base station 100 should comply. Therefore, it is possible to minimize the difference in ratios (modified ratios AR) used in neighboring macro base stations 100, and to reduce or prevent the aforementioned problem of interference caused by other macro base stations 100. In this embodiment, pico base stations 200 do not need to operate as common pico base stations.

Other Variations

Variation 1

The above-described embodiments are based on the time domain-based eICIC, and the resource setter 134 of the macro base station 100 sets the number of protected subframes PSF in a radio frame depending on various parameters. However, the frequency domain-based eICIC may be used instead of the time domain-based eICIC. In other words, the resource setter 134 may set the number of frequency bands (protected subcarriers) depending on various parameters. This variation may be applied to any of the above-described embodiments.

Figure 16:
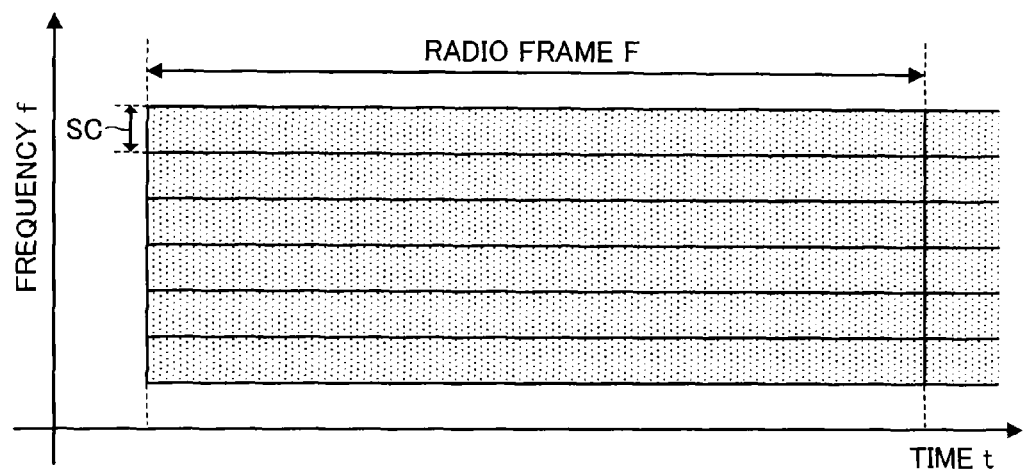
FIG. 16 is a view showing a format of the radio frame exchanged by communication elements in the radio communication system.

FIG. 16 is a view showing a format of the radio frame F exchanged by communication elements in the radio communication system from a standpoint different from FIG. 5. As described above, the radio frame F occupies a predetermined time length and a predetermined bandwidth. The radio frame F includes multiple subcarriers SC along the frequency direction. Each subcarrier SC is a transmission unit occupying a frequency band (for example, 15 kHz) that is narrower than that of the radio frame F. Only six subcarriers SC are illustrated, but it will be appreciated that any number of subcarriers SC may be included in the radio frame F. In order to illustrate that multiple subcarriers SC are mutually orthogonal in the frequency domain, FIG. 16 shows that subcarriers SC do not overlap one on another. In fact, subcarriers SC (in particular, subcarriers SC of which the center frequencies are adjacent) may overlap at least partially.

Although FIG. 16 does not explicitly shows subframes SF, in contrast to FIG. 5, this is not intended to mean that the radio frame F lacks subframes SF. FIG. 16 is a view in which subcarriers SC that are transmission units in the frequency domain are emphasized, and it omits illustration of subframes SF.

Figure 17:
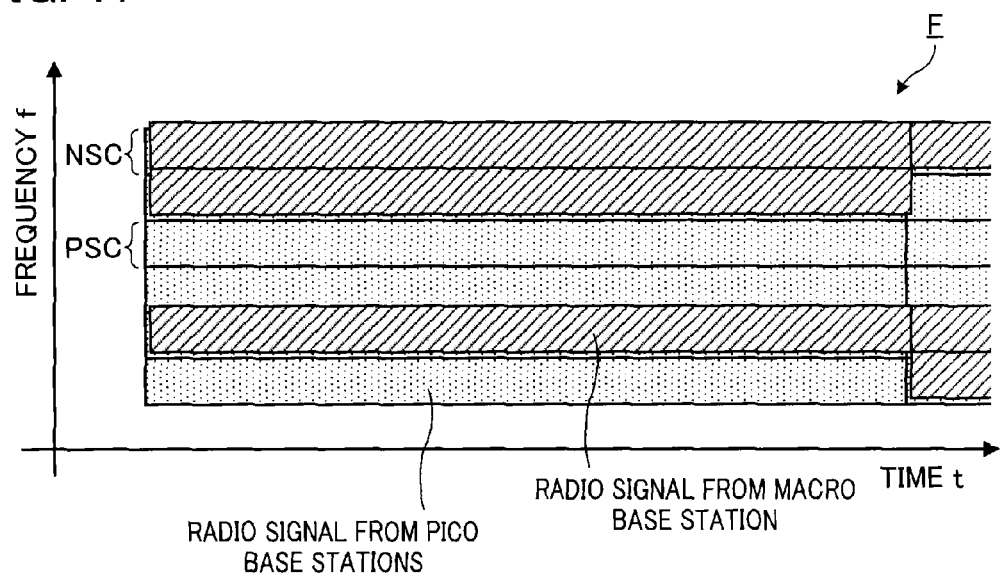
FIG. 17 is a schematic view showing frequency domain-based inter-cell interference control.

FIG. 17 is a schematic view for showing frequency domain-based eICIC. The communication controller 136 of the radio communicator 110 of the macro base station 100 controls the radio communicator 110 to alter execution and stop of transmission of radio signals for each subcarrier SC. The subcarrier SC at which the macro base station 100 stops transmission of the radio signal is called a protected subcarrier PSC since the radio signal from the pico base station 200 is protected from interference by the macro base station 100. On the other hand, the subcarrier SC at which the macro base station 100 executes transmission of the radio signal is called a non-protected subcarrier NSC. On the other hand, the radio communicator 210 of the pico base station 200 can transmit radio signals to user equipments 300 at all bandwidth of the radio frames F, i.e., at both non-protected subcarriers NSC and protected subcarriers PSC.

At the protected subcarriers PSC at which the radio communicator 110 of the macro base station 100 does not transmit the radio signal, only the radio communicator 210 of the pico base station 200 transmits the radio signal. Thus, at the protected subcarriers PSC, the radio signal from the pico base station 200 is not subject to interference by the radio signal from the macro base station 100, so that the mobile terminals 300 visiting the pico cell Cp defined by the pico base station 200 can receive the radio signals from the pico base station 200 of good quality.

In this variation radio communication system based on the frequency domain-based eICIC, the resource setter 134 of the macro base station 100 may set the ratio of the protected subcarriers PSC in a radio resource (radio frame F) occupying the predetermined time length and the predetermined frequency bandwidth, depending on the above-described various parameters. In other words, the resource setter 134 may set the ratio of the number of the second resources to the sum of the number of the first resources (non-protected subcarriers NSC) at which the radio communicator 110 of the macro base station 100 should execute wireless communication and the number of the second resources (protected subcarriers PSC) at which the radio communicator 110 of the macro base station 100 should stop wireless communication.

In a case in which, among all mobile terminals 300, there are many mobile terminals that are assumed to be connected with the macro base station 100, rather than the pico radio base stations 200 if CRE is not applied, or in a case in which the usage ratio of the resources for such mobile terminals (usage ratio of the protected subcarriers PSC) is high, when the macro base station 100 utilizes many non-protected subcarriers NSC, the reception quality at the mobile terminals 300 located at the edge of the pico cell Cp is likely to be lowered due to the interference from the macro base station 100. In this situation, it is suitable to reduce the ratio of non-protected subcarriers NSC usable by the macro base station 100 (first resources at which the macro base station 100 executes wireless communication) and to increase the ratio of protected subcarriers PSC unusable by the macro base station 100 (second resources at which the macro base station 100 stops wireless communication). In the converse situation, it is suitable to increase the ratio of non-protected subcarriers NSC usable by the macro base station 100 and to reduce the ratio of protected subcarriers PSC unusable by the macro base station 100.

After setting the aforementioned ratio, the resource setter 134 generates resource allocation information AL on the basis of the ratio. The resource allocation information AL is information indicating the ratio of protected subcarriers PSC. The resource setter 134 supplies the resource allocation information AL to the communication controller 136. On the basis of the resource allocation information AL, the communication controller 136 controls the radio communicator 110. In addition, the resource setter 134 may send the resource allocation information AL via the inter-base station communicator 120 to the pico base stations 200.

Although a variation in which subcarriers are used for frequency bands, carrier wave frequencies (carriers) may be used for frequency bands. In other words, the macro base station may execute wireless communication at some carrier wave frequencies (first resources) and may stop wireless communication at other carrier wave frequencies (second resources), whereas the pico base stations may execute wireless communication at all carrier wave frequencies.

Variation 2

Resource block-based eICIC may be utilized. In other words, the resource setter 134 may set the number of resource blocks depending on various parameters. This variation may be applied to any of the above-described embodiments.

Figure 18:
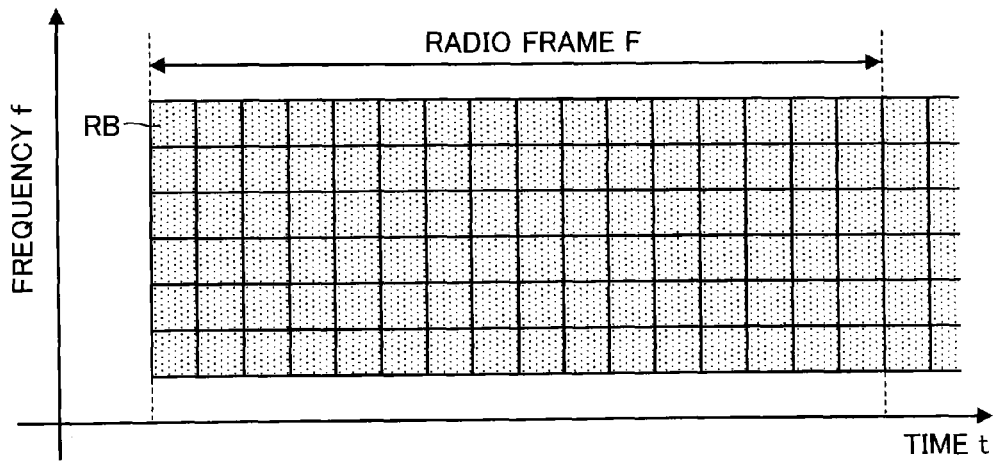
FIG. 18 is a view showing a format of the radio frame exchanged by communication elements in the radio communication system.

FIG. 18 is a view showing a format of the radio frame F exchanged by communication elements in the radio communication system from a standpoint different from FIGS. 5 and 16. As described above, the radio frame F occupies a predetermined time length and a predetermined bandwidth. The radio frame F includes multiple resource blocks RB. Each resource block RB is a transmission unit occupying a time length (for example, 1 millisecond) that is shorter than that of the radio frame F and a frequency band (for example, 180 kHz) that is narrower than that of the radio frame F. Only 96 resource blocks RB are illustrated per radio frame F, but it will be appreciated that any number of resource blocks RB may be included in the radio frame F. Although not illustrated, each resource block RB includes multiple resource elements that are smaller transmission units.

Although FIG. 18 does not explicitly shows subframes SF in contrast to FIG. 5 and does not explicitly shows subcarriers SC in contrast to FIG. 16, it is not intended to mean that the radio frame F lacks subframes SF or subcarriers SC. FIG. 18 is a view in which resource blocks RB that are transmission units having a predetermined time length and a predetermined frequency band are emphasized, and it omits illustration of subframes SF and subcarriers SC.

Figure 19:
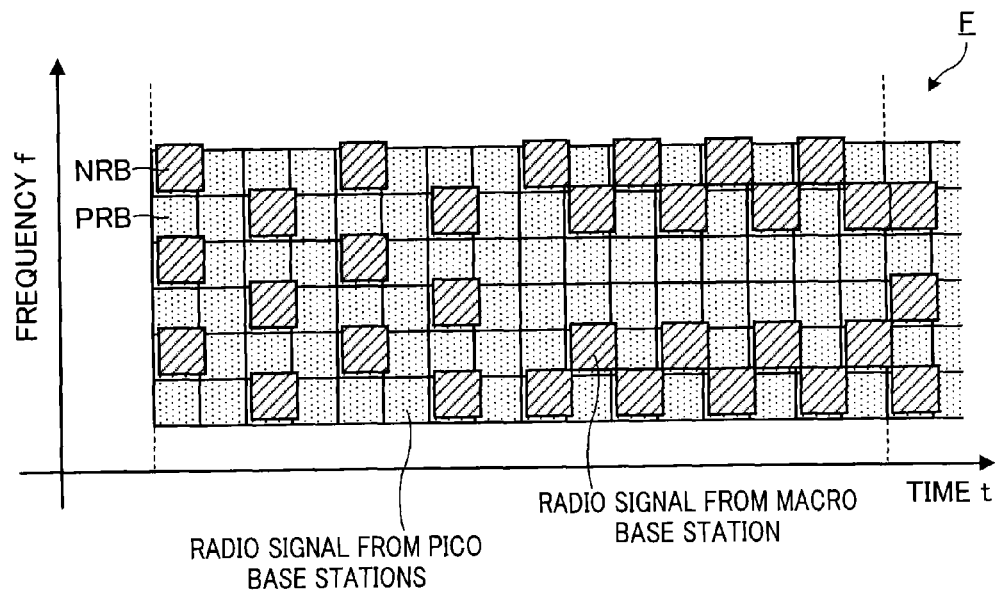
FIG. 19 is a schematic view for showing resource block-based inter-cell interference control.

FIG. 19 is a schematic view for showing resource block-based eICIC. The communication controller 136 of the radio communicator 110 of the macro base station 100 controls the radio communicator 110 to alter execution and stop of transmission of radio signals for each resource block RB. The resource block RB, at which the macro base station 100 stops transmission of the radio signal, is called a protected resource block PRB, since the radio signals from the pico base station 200 are protected from interference by the macro base station 100. On the other hand, the resource block RB at which the macro base station 100 executes transmission of the radio signal is called a non-protected resource block NRB. On the other hand, the radio communicator 210 of the pico base station 200 can transmit radio signals to user equipments 300 at all resource blocks of the radio frames F, i.e., at both non-protected resource blocks NRB and protected resource blocks PRB.

At the protected resource blocks PRB at which the radio communicator 110 of the macro base station 100 does not transmit the radio signal, only the radio communicator 210 of the pico base station 200 transmits the radio signal. Thus, at the protected resource blocks PRB, the radio signal from the pico base station 200 is not subject to interference by the radio signals from the macro base station 100, so that the mobile terminals 300 visiting the pico cell Cp defined by the pico base station 200 can receive the radio signals from the pico base station 200 of good quality.

In the variation radio communication system based on the resource block-based eICIC, the resource setter 134 of the macro base station 100 may set the ratio of the protected resource blocks PRB in a radio resource (radio frame F) occupying the predetermined time length and the predetermined frequency bandwidth, depending on the above-described various parameters. In other words, the resource setter 134 may set the ratio of the number of the second resources to the sum of the number of the first resources (non-protected resource blocks NRB) at which the radio communicator 110 of the macro base station 100 should execute wireless communication and the number of the second resources (protected resource blocks PRB) at which the radio communicator 110 of the macro base station 100 should stop wireless communication.

In a case in which, among all mobile terminals 300, there are many mobile terminals that are assumed to be connected with the macro base station 100, rather than the pico radio base stations 200 if CRE is not applied, or in a case in which the usage ratio of the resources for such mobile terminals (usage ratio of the protected resource blocks PRB) is high, when the macro base station 100 utilizes many non-protected resource blocks NRB, the reception quality at the mobile terminals 300 located at the edge of the pico cell Cp is likely to be lowered due to the interference of the macro base station 100. In this situation, it is suitable to reduce the ratio of non-protected resource blocks NRB usable by the macro base station 100 (first resources at which the macro base station 100 executes wireless communication) and to increase the ratio of protected resource blocks PRB unusable by the macro base station 100 (second resources at which the macro base station 100 stops wireless communication). In the converse situation, it is suitable to increase the ratio of non-protected resource blocks NRB usable by the macro base station 100 and to reduce the ratio of protected resource blocks PRB unusable by the macro base station 100.

After setting the aforementioned ratio, the resource setter 134 generates resource allocation information AL on the basis of the ratio. The resource allocation information AL is information indicating the ratio of protected resource blocks PRB. The resource setter 134 supplies the resource allocation information AL to the communication controller 136. On the basis of the resource allocation information AL, the communication controller 136 controls the radio communicator 110. In addition, the resource setter 134 may send the resource allocation information AL via the inter-base station communicator 120 to the pico base stations 200.

Variation 3

In the above-described embodiments, the reception characteristic of radio waves measured by the reception quality measurer 334 of the mobile terminal 300 is the reference signal received power (RSRP), but it may be the signal-to-interference and noise ratio (SINR), the reference signal reception quality (RSRQ), etc.

Variation 4

In the above-described embodiments, the reception characteristics of radio waves from the pico base stations 200 are modified by the use of the offset value (bias value) α for CRE. The reception characteristics of radio waves from the macro base station 100 or the pico base stations 200 may further be modified by another offset value (bias value) for other purposes. For example, a hysteresis offset value may be used for preventing mobile terminals 300 from being handed over to the originally serving radio base stations directly after handover.

Variation 5

In the above-described embodiments, the reception quality reporter 338 of the mobile terminal 300 reports the reception quality and the modified reception quality from multiple radio base stations to the desired radio base station, and the access point selector 138 of the macro base station 100 and the access point selectors 238 of the pico base stations 200 select the radio base station to which the mobile terminal 300 should be connected on the basis of the reception power result report from the mobile terminal 300. However, the mobile terminal 300 may compare the reception quality and the modified reception quality from multiple radio base stations, and may report a signal indicating the best reception quality or the radio base station corresponding to the best reception quality to the desired radio base station. The access point selector 138 of the macro base station 100 and the access point selectors 238 of the pico base stations 200 may select the radio base station corresponding to the best reception quality as the radio base station to which the mobile terminal 300 should be connected on the basis of the report from the mobile terminal 300.

Variation 6

In the above-described embodiments, the pico base stations 200 are used as examples of base stations having a lower transmission capability than the macro base station 100. A micro base station, a nano base station, a femto base station, or the like may be used as a low-power radio base station having a lower transmission capability. In particular, the radio network may be constituted of a combination of a plurality types of base stations having different transmission capabilities (for example, a combination of macro base stations, pico base stations, and femto base stations). In the above-described embodiments, pico eNodeBs are used as low-power radio base stations, and the pico eNodeB selects the radio base station to which a mobile terminal 300 should be connected on the basis of reception quality information received from the mobile terminal 300 connected to the pico eNodeB. However, the low-power radio base station may be a remote radio head that forwards the reception quality information received from the mobile terminal 300 to the macro base station, in which the macro base station selects the radio base station to which the mobile terminal 300 should be connected.

Variation 7

The mobile terminal 300 may be any type of device that can perform radio communication with each of the radio base stations. The mobile terminal 300 may be a cell phone terminal, e.g., a feature phone or a smart phone, a desk-top type personal computer, a laptop personal computer, a UMPC (ultra-mobile personal computer), a portable game machine, or another radio terminal.

Variation 8

In each of elements in the radio communication system (the macro base station 100, the pico base stations 200, and the mobile terminals 300), functions executed by the CPU may be executed by hardware or a programmable logic device, such as an FPGA (Field Programmable Gate Array) or a DSP (Digital Signal Processor), instead of the CPU.

The above-described embodiments and variations may be combined as long as there is no conflict.

REFERENCE SYMBOLS

100: macro base station (high-power radio base station)
200: pico base station (low-power radio base station)
Cm: macro cell (first cell)
Cp: pico cell (second cell)
110: radio communicator
112: transceiving antenna
120: inter-base station communicator (minimum value receiver)
130: controller
134: resource setter
136: communication controller
138: access point selector
212: transceiving antenna
210: radio communicator
220: inter-base station communicator
230: controller
238: access point selector (minimum value selector, minimum value reporter)
300: mobile terminal
310: radio communicator
312: transceiving antenna
320: signal separator
330: control signal demodulator 332: data signal demodulator
334: reception quality measurer
336: reception quality modifier
338: reception quality reporter

The invention claimed is:

1. A radio communication system comprising:
at least one high-power radio base station that forms a first cell and communicates with multiple mobile terminals; and
at least one low-power radio base station connected with the high-power radio base station and communicates with multiple mobile terminals, the low-power radio base station having a transmission power less than a transmission power of the high-power radio base station and forming a second cell within the first cell, the second cell being smaller than the first cell,
the high-power radio base station being configured to execute wireless transmission to the mobile terminals using resources that are the same as resources used by the low-power radio base station, and being configured to collaborate with the low-power radio base station for inter-cell interference control,
the high-power radio base station comprising:
a radio communicator configured to execute wireless communication with mobile terminals connected with the high-power radio base station;
a resource setter configured to determine a ratio of the number of second resources at which the radio communicator of the high-power radio base station should stop radio transmission to the sum of the number of the second resources and the number of first resources at which the radio communicator of the high-power radio base station should execute radio transmission; and
a communication controller configured to execute radio transmission at the first resources and to stop radio transmission at the second resources in accordance with the ratio determined by the resource setter or a modified ratio resulting from modification of the ratio,
the resource setter being configured to determine the ratio on the basis of a first proportion and a second proportion, the first proportion being a proportion of the number of mobile terminals that are assumed to be connected with the high-power radio base station, rather than the low-power radio base station, when cell range expansion is not applied, but are connected with the low-power radio base station by virtue of application of cell range expansion to the total number of mobile terminals located in the first cell and connected with the high-power radio base station or the low-power radio base station, the second proportion being a proportion of the number of mobile terminals connected with the high-power radio base station when cell range expansion is applied to the total number of mobile terminals located in the first cell and connected with the high-power radio base station or the low-power radio base station, the resource setter being configured to determine the ratio in such a manner that the greater the proportion of the second proportion to the first proportion, the smaller the ratio.

2. The radio communication system according to claim 1, wherein the resource setter is configured to determine the ratio on the basis of an actual usage ratio of the resources at the high-power radio base station, in such a manner that the lower the usage ratio, the smaller the ratio.

3. A radio communication system comprising:
at least one high-power radio base station that forms a first cell and communicates with multiple mobile terminals; and
at least one low-power radio base station connected with the high-power radio base station and communicates with multiple mobile terminals, the low-power radio base station having a transmission power less than a transmission power of the high-power radio base station and forming a second cell within the first cell, the second cell being smaller than the first cell,
the high-power radio base station being configured to execute wireless transmission to the mobile terminals using resources that are the same as resources used by the low-power radio base station, and being configured to collaborate with the low-power radio base station for inter-cell interference control,
the high-power radio base station comprising:
a radio communicator configured to execute wireless communication with mobile terminals connected with the high-power radio base station;
a resource setter configured to determine a ratio of the number of second resources at which the radio communicator of the high-power radio base station should stop radio transmission to the sum of the number of the second resources and the number of first resources at which the radio communicator of the high-power radio base station should execute radio transmission; and
a communication controller configured to execute radio transmission at the first resources and to stop radio transmission at the second resources in accordance with the ratio determined by the resource setter or a modified ratio resulting from modification of the ratio,
the resource setter being configured to determine the ratio on the basis of a first number and a second number, the first number being the number of mobile terminals that are assumed to be connected with the high-power radio base station, rather than the low-power radio base station, when cell range expansion is not applied, but are connected with the low-power radio base station by virtue of application of cell range expansion, the second number being the number of mobile terminals connected with the high-power radio base station when cell range expansion is applied, the resource setter being configured to determine the ratio in such a manner that the greater the proportion of the second number to the first number, the smaller the ratio.

4. The radio communication system according to claim 3, wherein the resource setter is configured to determine the ratio on the basis of an actual usage ratio of the resources at the high-power radio base station, in such a manner that the lower the usage ratio, the smaller the ratio.

5. A radio base station communicating with mobile terminals and being configured to execute wireless transmission to the mobile terminals using resources that are the same as resources used by a low-power radio base station having a transmission power less than a transmission power of the radio base station and forming a second cell within a first cell formed by the radio base station, the radio base station being configured to collaborate with the low-power radio base station for inter-cell interference control, the radio base station comprising:
a radio communicator configured to execute wireless communication with mobile terminals connected with the radio base station;
a resource setter configured to determine a ratio of the number of second resources at which the radio communicator should stop radio transmission to the sum of the number of the second resources and the number of first resources at which the radio communicator should execute radio transmission; and a communication controller configured to execute radio transmission at the first resources and to stop radio transmission at the second resources in accordance with the ratio determined by the resource setter or a modified ratio resulting from modification of the ratio, the resource setter being configured to determine the ratio on the basis of a first proportion and a second proportion, the first proportion being a proportion of the number of mobile terminals that are assumed to be connected with the radio base station, rather than the low-power radio base station, when cell range expansion is not applied, but are connected with the low-power radio base station by virtue of application of cell range expansion to the total number of mobile terminals located in the first cell and connected with the radio base station or the low-power radio base station, the second proportion being a proportion of the number of mobile terminals connected with the radio base station when cell range expansion is applied to the total number of mobile terminals located in the first cell and connected with the radio base station or the low-power radio base station, the resource setter being configured to determine the ratio in such a manner that the greater the proportion of the second proportion to the first proportion, the smaller the ratio.

6. A radio base station communicating with mobile terminals and being configured to execute wireless transmission to the mobile terminals using resources that are the same as resources used by a low-power radio base station having a transmission power less than a transmission power of the radio base station and forming a second cell within a first cell formed by the radio base station, the radio base station being configured to collaborate with the low-power radio base station for inter-cell interference control, the radio base station comprising:

a radio communicator configured to execute wireless communication with mobile terminals connected with the radio base station;

a resource setter configured to determine a ratio of the number of second resources at which the radio communicator should stop radio transmission to the sum of the number of the second resources and the number of first resources at which the radio communicator should execute radio transmission; and a communication controller configured to execute radio transmission at the first resources and to stop radio transmission at the second resources in accordance with the ratio determined by the resource setter or a modified ratio resulting from modification of the ratio, the resource setter being configured to determine the ratio on the basis of a first number and a second number, the first number being the number of mobile terminals that are assumed to be connected with the radio base station, rather than the low-power radio base station, when cell range expansion is not applied, but are connected with the low-power radio base station by virtue of application of cell range expansion, the second number being the number of mobile terminals connected with the radio base station when cell range expansion is applied, the resource setter being configured to determine the ratio in such a manner that the greater the proportion of the second number to the first number, the smaller the ratio.

* * * * *